(12) United States Patent
Fradet

(10) Patent No.: US 8,074,934 B2
(45) Date of Patent: Dec. 13, 2011

(54) INTERLOCK RESERVE PARACHUTE DEPLOYMENT SYSTEM

(76) Inventor: Eric Fradet, Tallard (FR)

(*) Notice: Subject to any disclaimer, the term of this patent is extended or adjusted under 35 U.S.C. 154(b) by 556 days.

(21) Appl. No.: 12/231,916

(22) Filed: Sep. 8, 2008

(65) Prior Publication Data
US 2009/0127395 A1    May 21, 2009

(30) Foreign Application Priority Data

Nov. 16, 2007 (FR) ..................... 07 59092

(51) Int. Cl.
*B64D 10/00* (2006.01)

(52) U.S. Cl. .............. 244/147; 244/148; 244/151 R; 244/151 A; 244/151 B

(58) Field of Classification Search .......... 244/147, 244/148, 151 R, 151 A, 151 B
See application file for complete search history.

(56) References Cited

U.S. PATENT DOCUMENTS

| 6,056,242 A | 5/2000 | Collins |
| 7,118,073 B2* | 10/2006 | Booth ............... 244/149 |
| 2010/0032526 A1* | 2/2010 | Higgins ............ 244/148 |
| 2011/0024570 A1* | 2/2011 | Theodorovitz et al. ... 244/151 B |

FOREIGN PATENT DOCUMENTS

| FR | 2 706 855 | 12/1994 |
| GB | 837 237 | 6/1960 |
| WO | WO 2005/000678 | 1/2005 |

* cited by examiner

*Primary Examiner* — J. Woodrow Eldred
(74) *Attorney, Agent, or Firm* — Collard & Roe, P.C.

(57) ABSTRACT

A device, system and method of reserve parachute deployment comprising; a reserve bridle 2 connecting the reserve deployment bag 5 to the reserve pilot chute 4, and a lanyard 3 connecting the main parachute 1 to the reserve bridle 2 with a releasable attachment and a retention means of this attachment. This connection being placed onto a holding flap 17 of the reserve container 22, by releasable holding means. The system and method of realization allows the reserve parachute to be activated without cutting-away a main parachute, in a manner that the holding means are not released, while if the main parachute is cut away then the holding means release without the retention means doing so.

21 Claims, 26 Drawing Sheets

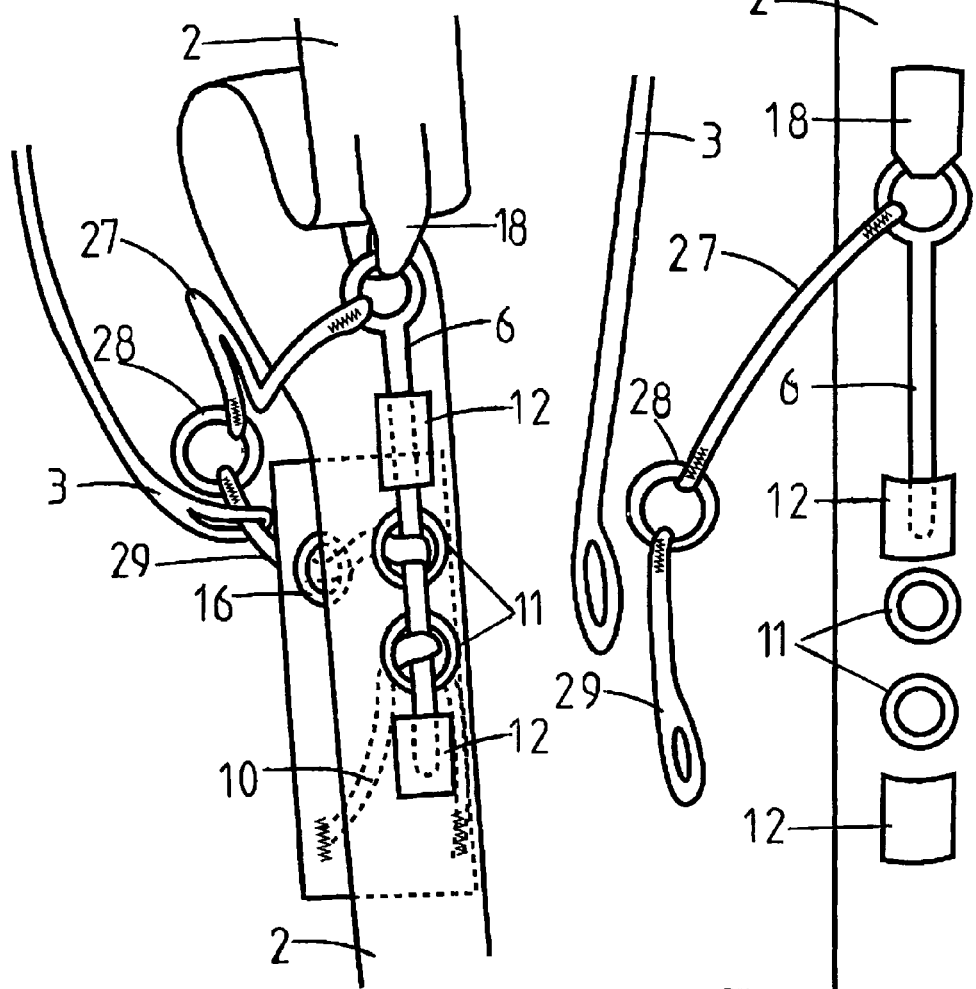

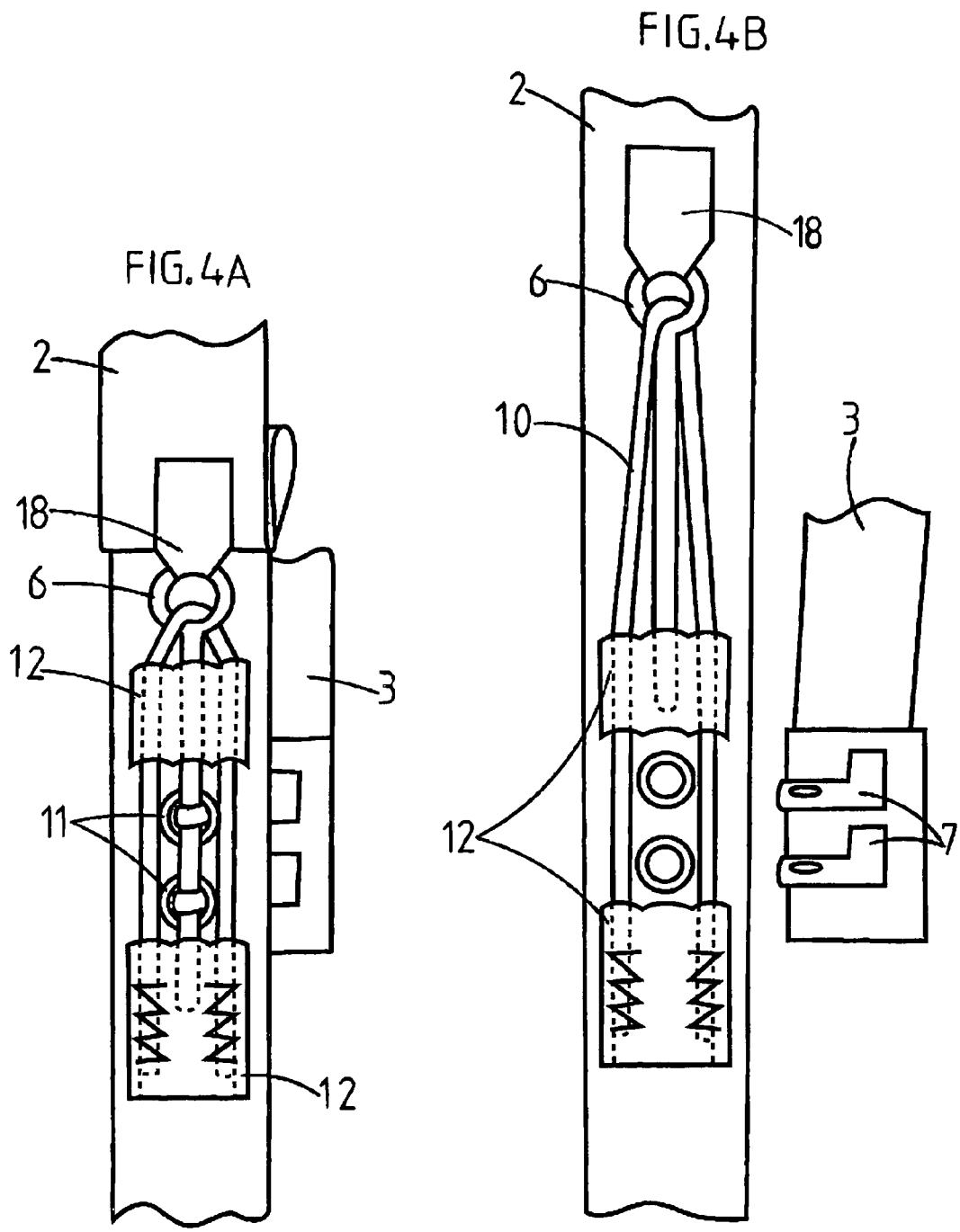

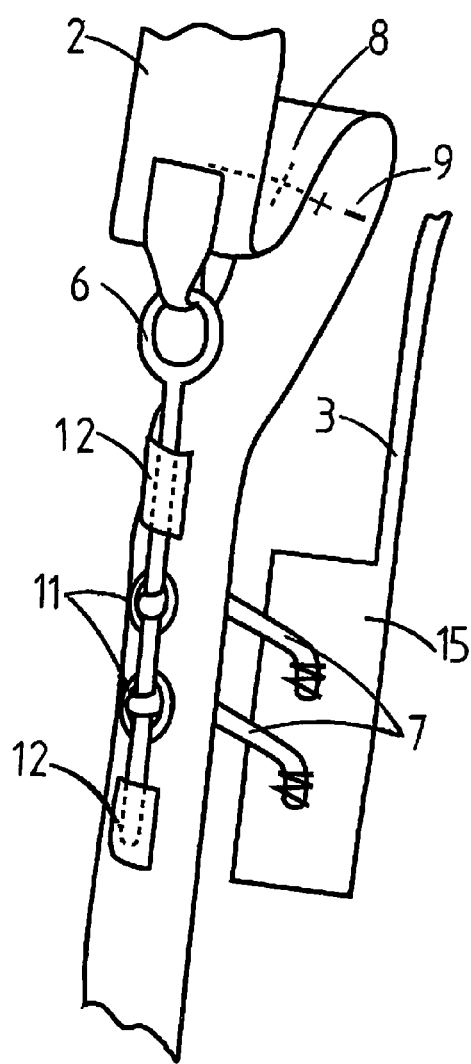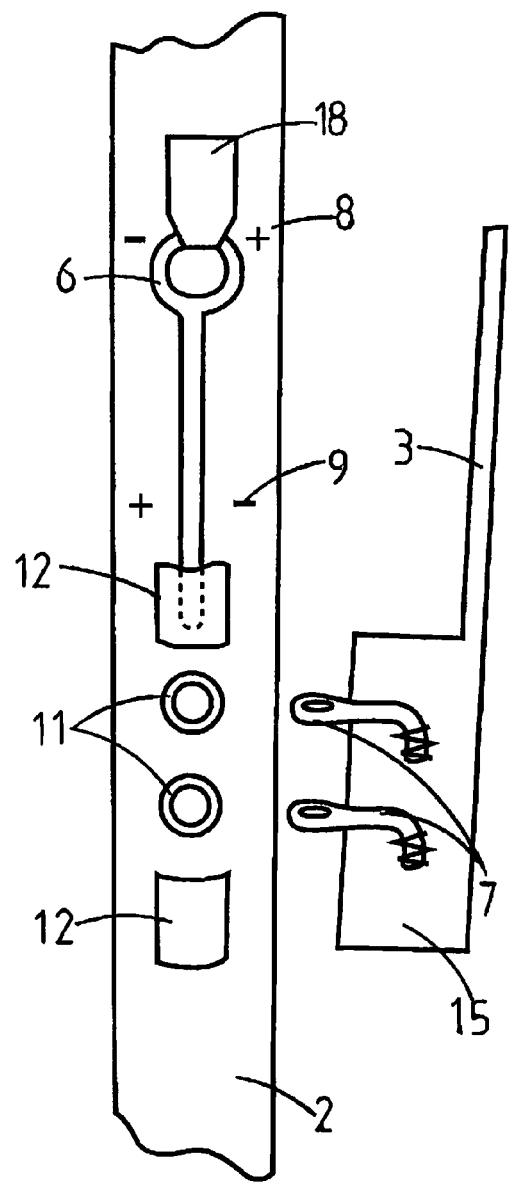

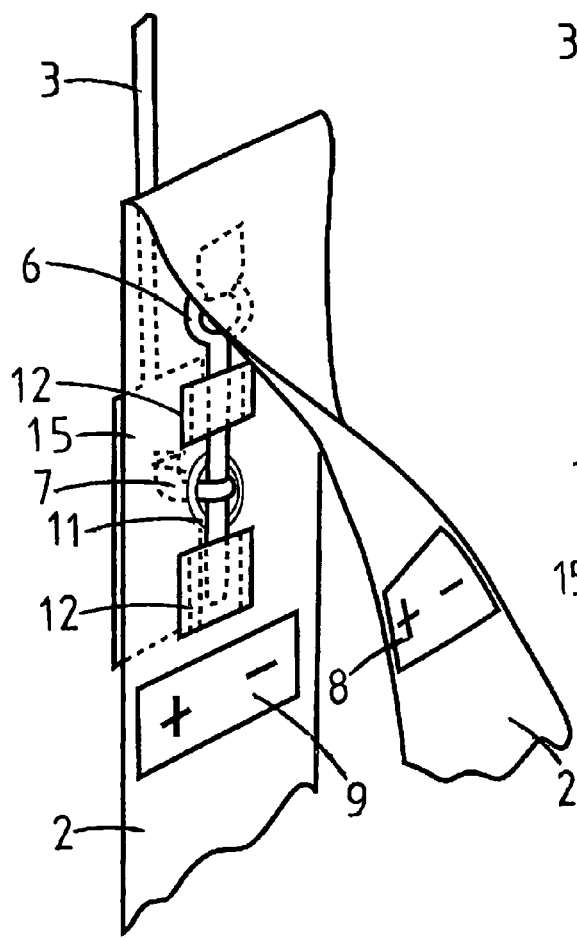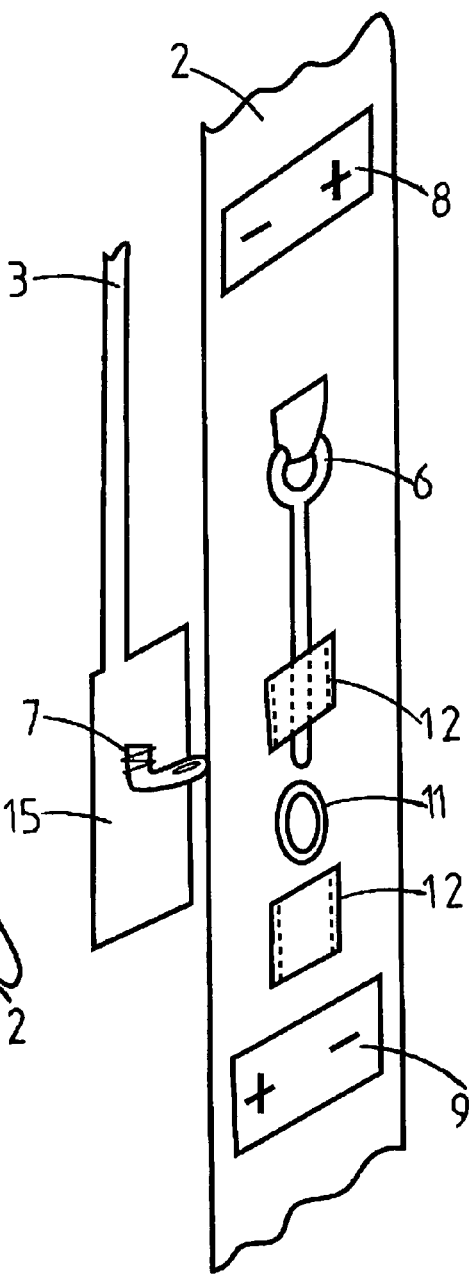

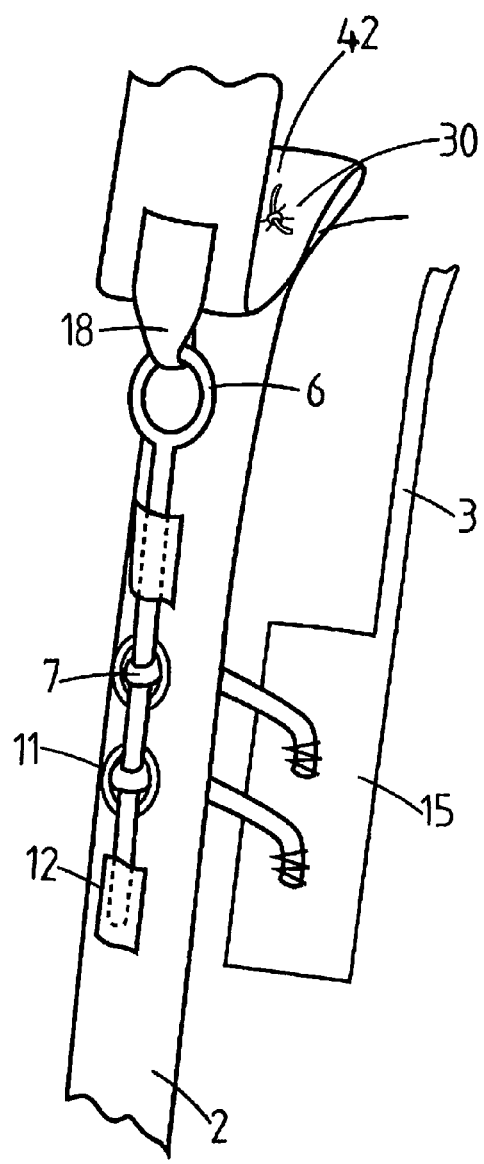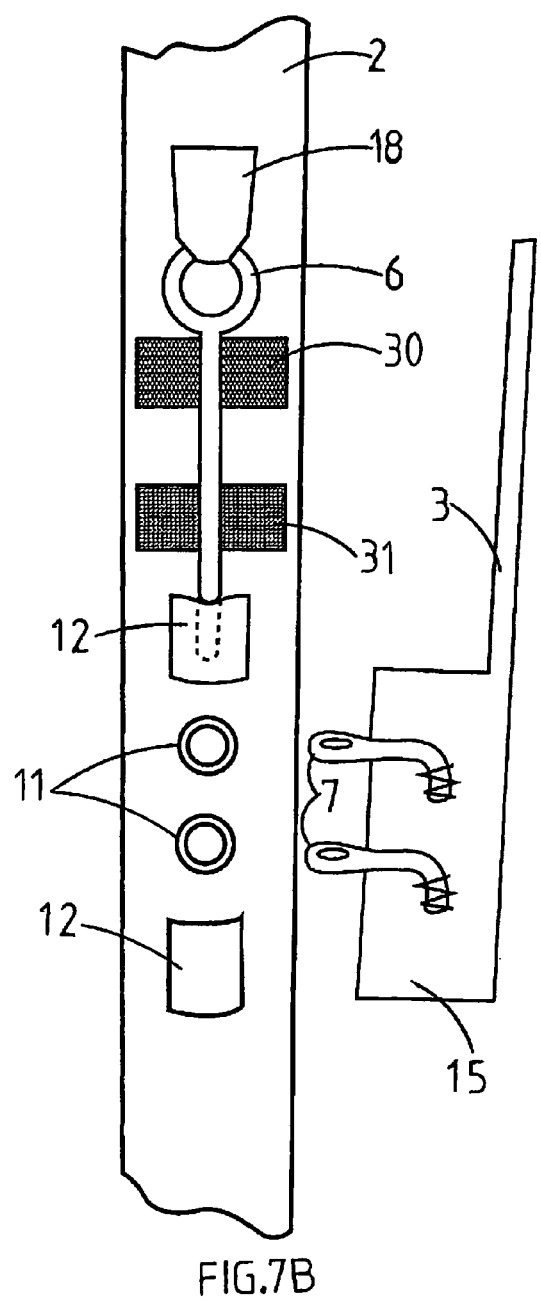
FIG.7A
FIG.7B

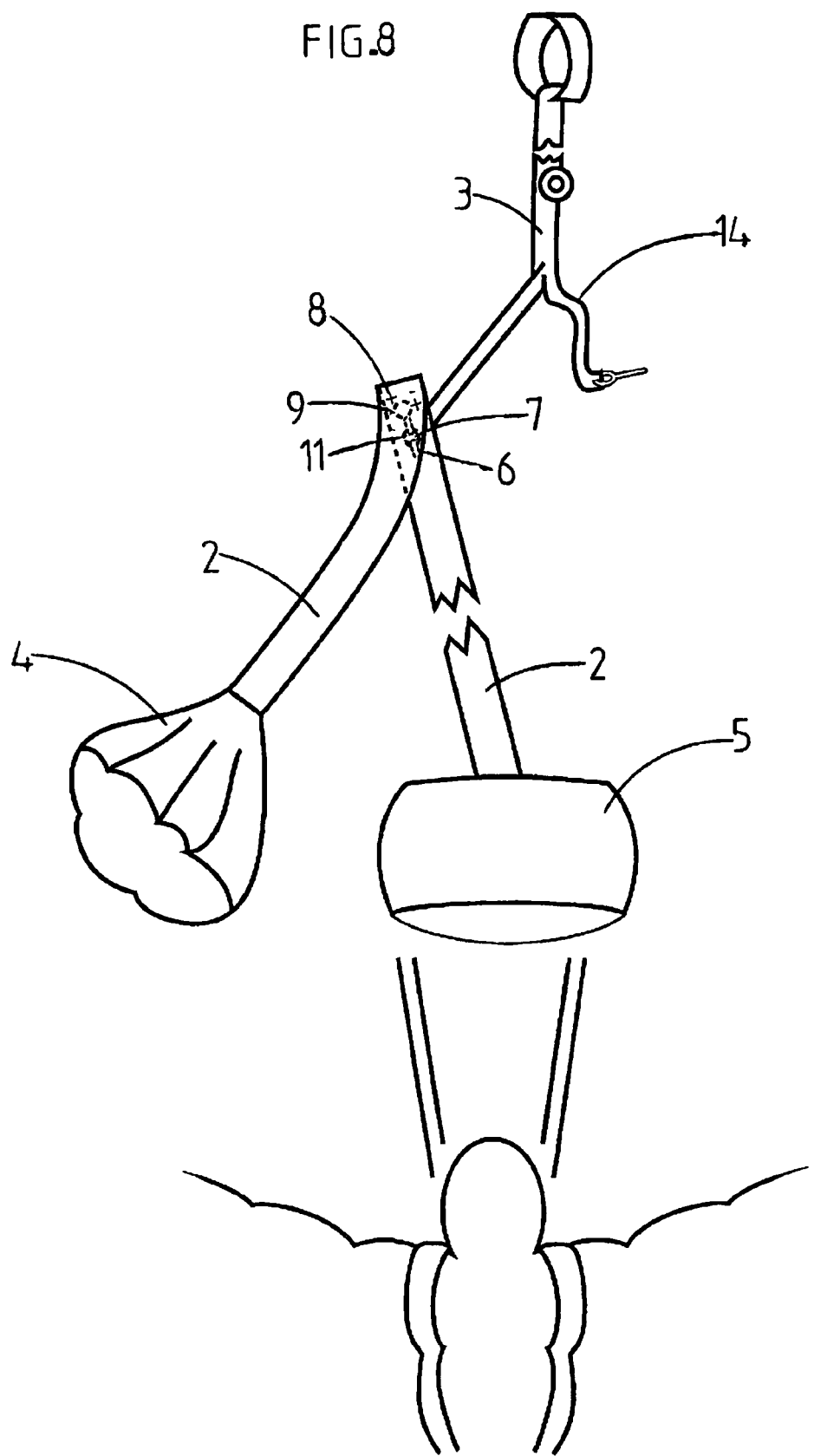

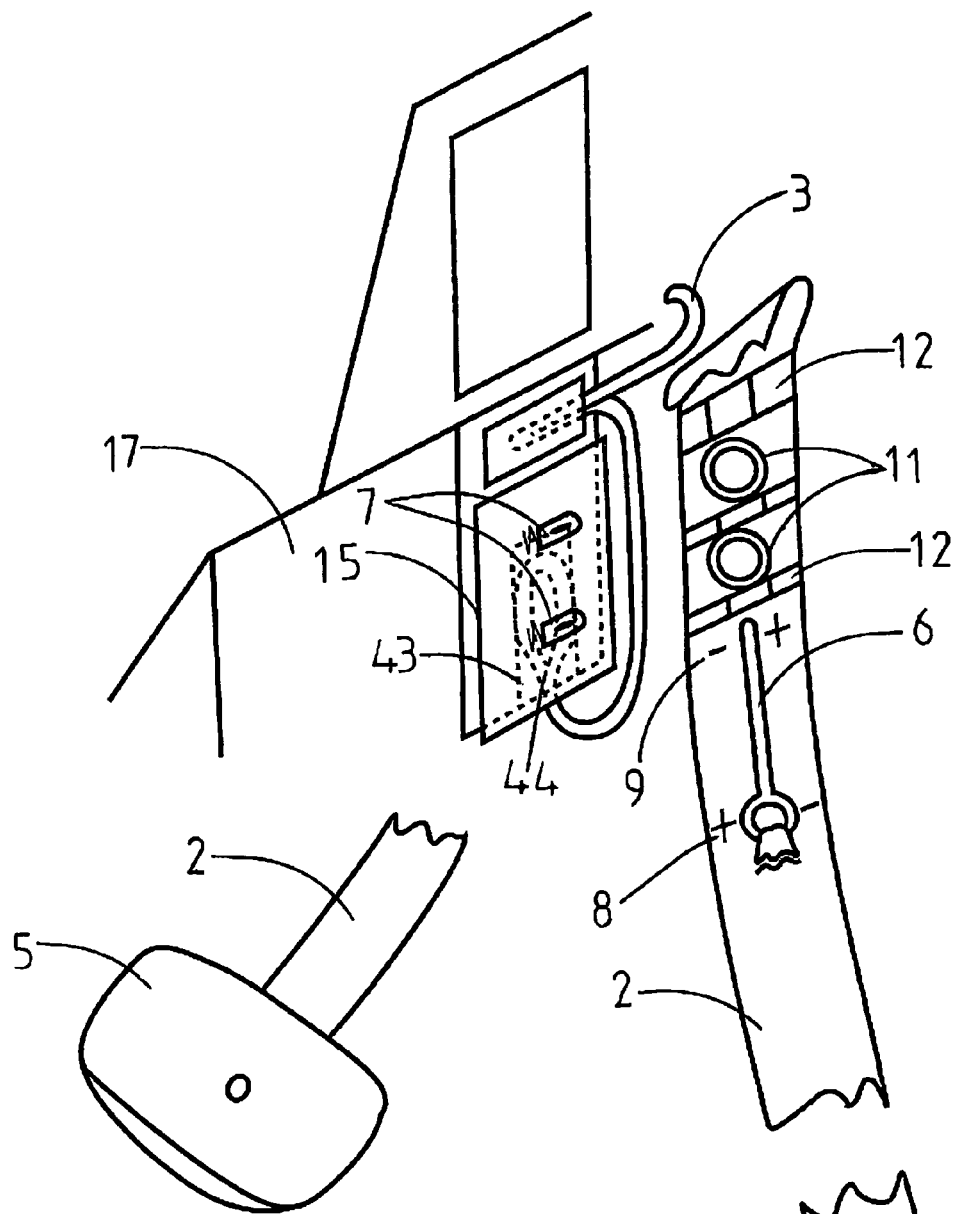
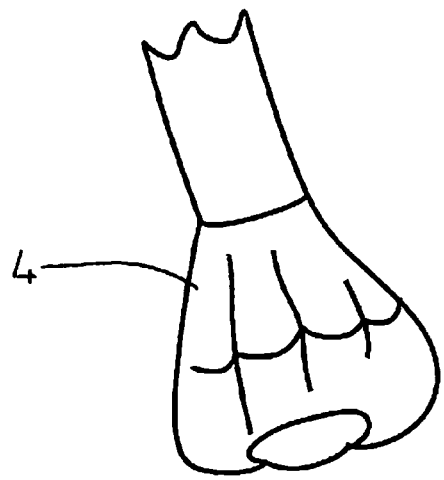
FIG.11D

FIG.15A
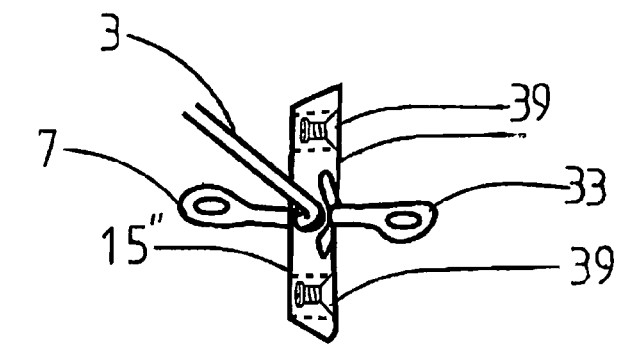
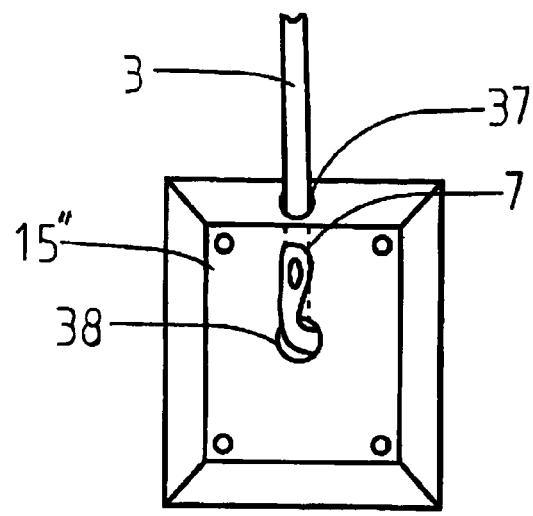
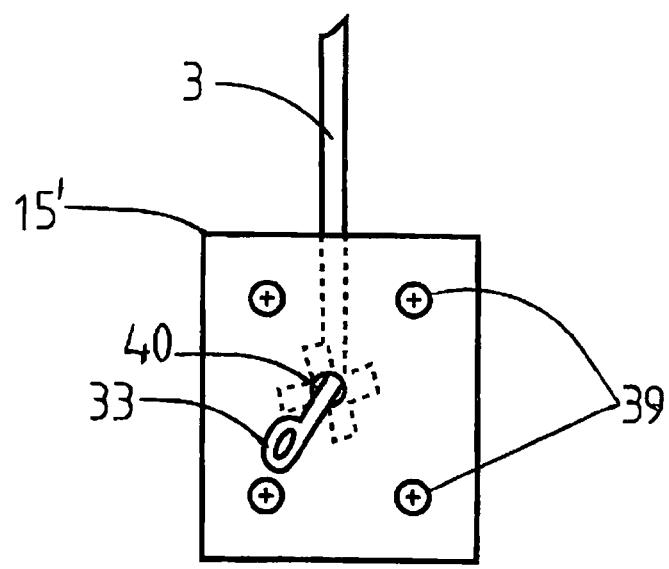

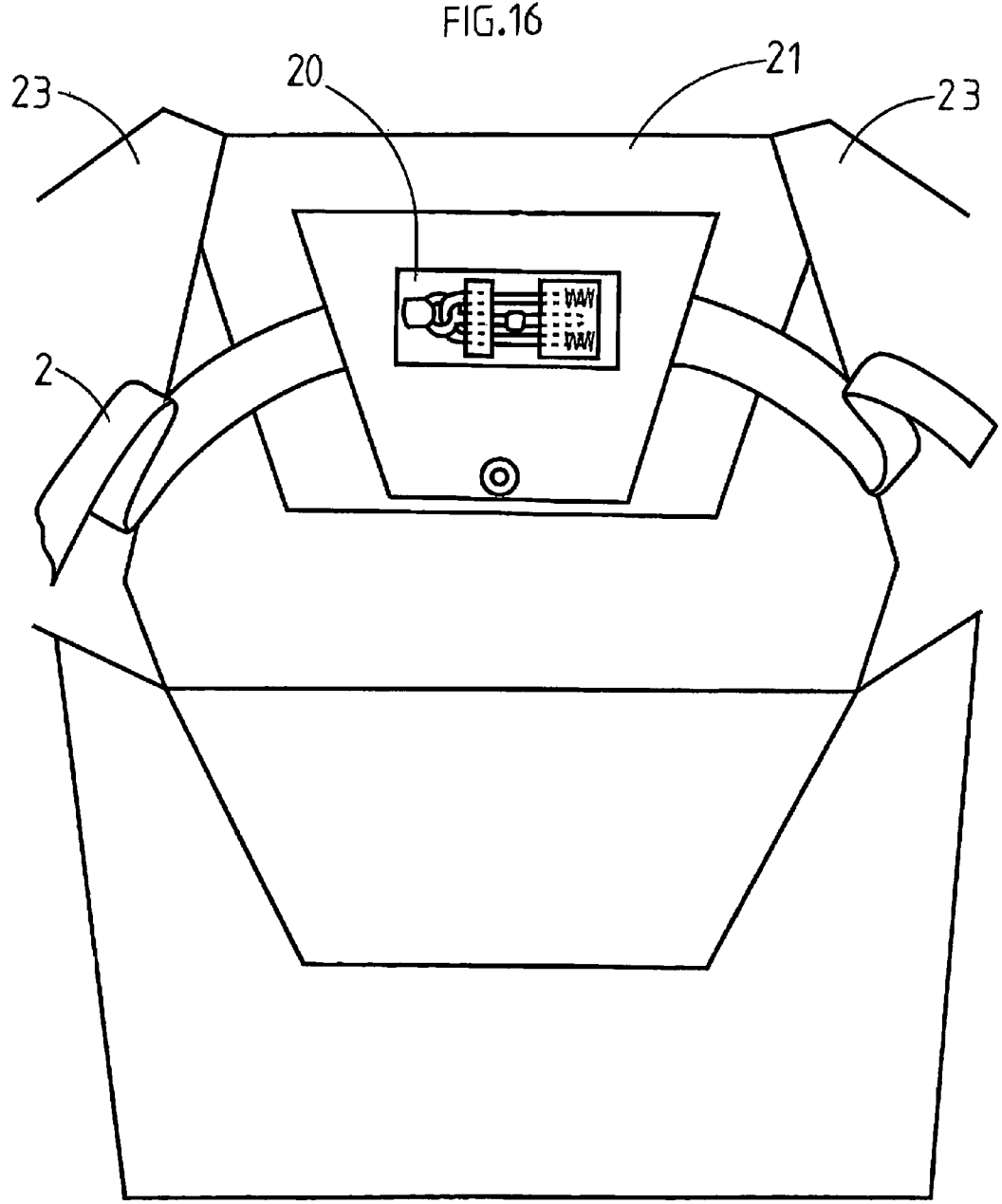

US 8,074,934 B2

INTERLOCK RESERVE PARACHUTE DEPLOYMENT SYSTEM

CROSS-REFERENCE TO RELATED APPLICATIONS

Applicant claims priority under 35 U.S.C. 119 of French patent application No. 0759092 filed on 16 Nov. 2007.

BACKGROUND OF THE INVENTION

The present invention relates to a device for main parachute cutaway and reserve parachute deployment. It will operate in skydiving, especially for low altitude jumps.

Traditionally, parachute equipment included a main parachute and a reserve parachute, which is as a backup in the case of a main parachute malfunction.

In the case of a malfunction of the main parachute, it is known that it is necessary that the main parachute must be entirely disconnected from the harness before the reserve parachute is deployed, in order to avoid entanglements between the main and the reserve parachutes, and the consequences there of, this is the so named <<cutaway>> procedure.

Moreover, during a cutaway procedure it is better that a device to reduce time and altitude loss required for the opening of the reserve parachute is incorporated. Such a device is obviously advantageous, in the sense that time and altitude savings in the sequence of the reserve parachute deployment, may save lives, in particular at low altitude, where the remaining time before impact is short.

Known temporary connection devices, also named Main Assisted Reserve Deployment (MARD), the Interlock device or the Skyhook, are intended to use the main parachute, once cutaway, as pilot chute for the extraction of the reserve parachute.

These devices show a number of problems, in particular when the device undergoes premature disconnection and consequently, does not give the benefit of the improved reserve deployment time/height.

With these types of devices, cases have been recorded of cutaway of the main parachute which only opened the reserve container, without the cutaway main parachute aiding in the extraction of the reserve deployment bag.

This malfunction is explained by the failure of retention of the MARD device, which can be caused by a disconnection during the stowing of the bridle of the Reserve Static Line (RSL lanyard) and the bridle of the reserve deployment bag.

In this way, all the advantage of the reduction in deployment time/height is lost, because the main parachute, once cutaway, does not cause a rapid extraction of the reserve deployment bag.

Another issue appears with the use of the Skyhook device in some reserve procedures, such as the procedure called reserve only (main parachute still in the main container). During the opening of the reserve container, at the moment the reserve pilot chute inflates, the means of holding the Skyhook device on the kicker flap does not have a sufficient retentive force so that the bridle of the reserve deployment bag is not immediately disconnected from the lanyard, which can cause a delay in the opening of the reserve parachute.

A need exists for a safer device, guaranteeing the time/height saving at every cutaway procedure and ensuring safety in case of a total main parachute malfunction and manual reserve parachute activation.

BRIEF SUMMARY OF THE INVENTION

To that effect, the present invention relates to a main parachute cutaway and reserve parachute deployment device incorporating, in a known manner, a reserve bridle, linking a reserve pilot chute to a reserve parachute deployment bag, and a lanyard, linking the main parachute to the reserve bridle.

The device is characterized by; at least one closing pin fastened to the reserve bridle, which slides through at least one loop fastened to the lanyard for the connection of the reserve bridle to the lanyard, and a connection retention means, designed to be overcome beyond a predefined force threshold.

The principle of the present invention is that the main parachute stays connected to the reserve bridle as long as the means of retention has not been overcome.

According to a particularly inventive design, the connection means includes a magnetic item attracting an iron/magnetic item.

The use of magnets on the reserve bridle is particularly advantageous for this device because it allows an accurate control of the retention means.

Other means of retention can include; an elastic item, break cord or touch fastener material.

It is advantageous to combine the retention means with a connection holding the attached reserve bridle and lanyard onto a reserve container flap.

According to the method of use of the preferred invention, for a more secure connection, between the reserve bridle and the lanyard, the fastening loop(s) of the lanyard is (are) placed on a stiff plate.

In order to realize a safer device, allowing it to function in all emergency situations, it is advantageous that the present invention is provided with some means of disconnection from the skydiver's main parachute, either in a voluntary or an automatic way, so that in the case of a riser breaking malfunction, the main parachute will be cutaway from the harness, avoiding entanglement of the main and the reserve parachutes.

An object of the invention is a harness-container including:
 a primary container, or bottom container, which receives a deployment bag in which the main canopy is packed, this is linked to riser groups, which are attached to the harness-container; by means of a release mechanism;
 a primary pilot chute linked to the deployment bag, packed inside or outside the container;
 means to release the riser groups of the main canopy from the harness-container in case of a main canopy malfunction;
 a control handle to cutaway/release the riser groups of the main canopy;
 a secondary container, or top container, which receives a reserve deployment bag in which the reserve canopy is packed, this is linked to riser groups which are part of the harness-container, which can not be released.
 a reserve pilot chute packed into the secondary container;
 a reserve bridle linking the reserve pilot chute with the reserve deployment bag;
 an RSL lanyard linked by one of its end ($E_1$) to the main canopy;
 a first connection means ($L_1$) carried by the other end ($E_2$) of the RSL lanyard and a first connection means ($L'_1$), complementary to the first connection means ($L_1$), carried by the reserve bridle, which in combination form the connection between the RSL lanyard and the reserve bridle, the aforesaid first connection means ($L_1$-$L'_1$) being arranged to be detachable only in case of a reserve only procedure;
 a second connection means ($L_2$) carried by the RSL lanyard and a second connection means ($L'_2$), complementary to the second connection means ($L_2$), carried by the RSL lanyard and/or the secondary container, forming in combination, the connection between the RSL lanyard and the secondary container, the aforesaid second connection means ($L_2$-$L'_2$) being arranged to be detachable only in case of a cutaway, when the main canopy pulls the RSL lanyard, which opens the secondary container, frees the reserve pilot chute from the secondary container and pulls the reserve bridle to extract the reserve deployment bag;

in which the aforesaid first ($L_1$-$L'_1$) and second ($L_2$-$L'_2$) connection means are arranged to guarantee that the aforesaid first connection means ($L_1$-$L'_1$) does not give way in case of a cutaway of the main canopy and that the aforesaid second connection means ($L_2$-$L'_2$) does not give way in case of reserve only.

Preferably, the connection means ($L_1$) and ($L_2$) are carried by a plate, the first connection means ($L_1$) being carried by one side of the plate and the connection means ($L_2$) being carried by the other side of the plate, the said plate being found at the end ($E_2$) of the RSL lanyard and, the harness container in it's assembled state, ready for use, has the RSL plate sandwiched, between a part of the reserve bridle which carries the first connection means ($L'_1$) and a surface of the inner flap of the secondary container which carries the second connection means ($L'_2$).

Preferably, both the first ($L_1$) and second ($L_2$) connection means of the RSL lanyard plate, are made up of at least one loop.

Preferably, the part of the reserve bridle carrying the first connection means ($L'_1$) includes one or several grommets for the passage of the aforesaid loop(s), constituting the first connection means ($L_1$), and in which a closing pin carrying at one end, a ring fixed onto the reserve bridle, and the other end of which passes through the aforesaid loop(s) constituting the first connection means ($L'_1$).

Preferably, the distance between; the attachment point of the ring on the closing pin, onto the reserve bridle and the grommet(s) set into the reserve bridle, is longer than the length of the pin.

Preferably, there are closing pin guiding means foreseen on the part of the reserve bridle carrying the first connection means ($L'_1$).

Preferably, the guiding means of the closing pin are made up of loop(s) and/or a tunnel fixed onto the reserve bridle and intended to receive the closing pin.

Preferably, a means of guaranteeing the maintenance of the first connection ($L_1$-$L'_1$) are foreseen on the reserve bridle, the aforesaid means of guaranteeing the maintenance of the first connection means, being formed by a fold of the reserve bridle on itself, the two parts of the reserve bridle forming the fold being joined by means chosen from: magnets, break tie, touch fastener and rubber bands.

Preferably, a pocket is foreseen on the surface of the inner flap to which the plate is applied, the parachute in its assembled state, ready for use, has the end of the plate, opposite to that attached to the end (E2) of the RSL lanyard, being introduced into the pocket in such a way that the loop(s) are outside of the pocket, in order to avoid the reserve bridle becoming trapped between the plate and the surface of the inner flap of the secondary container.

Preferably, the inner flap of the secondary container against which the plate is applied, includes one or several grommets for the passage of the aforesaid loop(s) carried by the plate constituting the second connection means ($L_2$), the RSL lanyard having a holding pin with a ring at one end through which the RSL lanyard passes, the other end of the holding pin going through the aforesaid loop(s) constituting the second connection means ($L'_2$), the sliding of the holding pin on the RSL lanyard towards the plate being limited by a stop, in such a way that the distance between the stop and the loop(s) of the plate is greater than the length of the holding pin.

Preferably, the RSL lanyard carries a means of guaranteeing the attachment of the second connection means ($L_2$-$L'_2$), complementary to the means of guaranteeing the attachment of the second connection means ($L_2$-$L'_2$) carried by the inner flap of the secondary container, the aforesaid means of guaranteeing the attachment of the second connection means ($L_2$-$L'_2$) being chosen from; magnets, break tie, touch fastener, rubber bands and a connection formed by a loop carried by the RSL bridle or the platform, and a pocket formed on the inner flap of the secondary container, into which said loop is introduced.

Preferably, the means of guaranteeing the attachment of the second connection means ($L_2$-$L'_2$) carried by the RSL lanyard, are carried on a piece of material sewn onto the RSL lanyard.

Preferably, means of guiding the holding pin are foreseen on the inner flap of the secondary container.

Preferably, the guiding means of the holding pin are made up of guiding loop(s) and/or a tunnel, foreseen attached to the inner flap intended to receive the holding pin, the aforesaid tunnel being sewn onto the inner flap of the secondary container.

Preferably, the second connection means ($L_2$), is made up of a loop in such a way that the plate is able to pivot around the loop in the plane of the inner flap of the secondary container.

Preferably, the force necessary to make the means of guaranteeing the attachment of the second connection means ($L_2$-$L'_2$) separate is greater than the force necessary to make the means of guaranteeing the maintenance of the first connection ($L_1$-$L'_1$) separate, so that the connection ($L_2$-$L'_2$) is more resistant than the connection ($L_1$-$L'_1$).

Preferably, the said first connection means ($L_1$) is formed by a loop formed at the end ($E_2$) of the RSL lanyard, the part of the reserve bridle bearing the first connection means ($L'_1$) having a grommet for the passage of said loop forming the first connection means ($L_1$), and wherein a closing pin, bearing at one end a ring fixed to the reserve bridle, whose other end is introduced into said loop and thereby constitutes the first connection means ($L'_1$)

Preferably, said second connection means (L2-L'2) are constituted by hook and loop fastener placed between a part of the RSL lanyard and the second container, or by a platform releasably fixed to the inner flap of the second container by means of a hook and loop fastener or magnets, and having a grommet through which is introduced the end ($E_2$) of the RSL lanyard.

Preferably, first connection means ($L'_1$) carried by the reserve bridle is formed by a closing pin, bearing at one end a ring fixed to the reserve bridle, said ring also bearing the first end of a closing bridle formed of two parts joined by a connection ring, a loop being formed at the free end of the closing bridle, so that, when the free end of the closing bridle bearing the loop is passed through the loop formed at the end ($E_2$) of the RSL lanyard, the loop of the closing bridle constitutes the first connection means ($L_1$), which passes through a grommet set into the part of the reserve bridle bearing the first connection means ($L'_1$), and into which is introduced the other end of the closing pin constituting the first connection means (L'1).

Preferably, said second connection means (L2-L'2) are constituted by a platform releasably fixed to the inner flap of the second container by means of a hook and loop fastener or magnets, and having a grommet through which is introduced the free end of the closing bridle, the platform being incorporated between the loop of the end ($E_2$) of the RSL lanyard and the reserve bridle.

Other goals and advantages will become apparent during the following description of the method of use of the invention, which is however not restrictive.

According to these possibilities but not restrictive variants of the invention, the device is arranged such that:
the retention means include at least one magnetic item;
the retention means include at least one iron-magnetic item, fit to be attracted by the magnetic item;
the magnetic item and the iron-magnetic item are preferentially fixed on the reserve bridle so that they come in mutual contact when the fasten pin is in a locked position, capturing the fastening loop;
the iron-magnetic item is the closing pin;
the magnetic item is a permanent magnet;
the retention means include an elastic item;
the retention means include break cord;
the retention means include touch fastener material;
the reserve bridle includes at least one grommet fitted to allow the passing of at least one fastening loop of the lanyard;
on both sides of the grommet, it can include a tunnel, laid out so as to guide the sliding of the closing pin;
the closing pin is fastened to the reserve bridle by a ring in such a way that the length between the fastening point and its end is less than the distance between the aforementioned fastening point and the grommet;
it includes a harness intended to be worn by the user and some means of main parachute disconnection and reserve container opening, including:
one reserve container opening control;
one cutaway handle; with one cable connecting the riser which is equipped with the lanyard and a second cable connecting the riser which is not equipped with the lanyard;
one lanyard, attached at one end to a riser, at the other end to the Interlock device, and in a middle section a means of activating the reserve.

BRIEF DESCRIPTION OF THE SEVERAL VIEWS OF THE DRAWING

The enclosed figures are given as an example and do not restrict the invention. They only represent one variation of the invention and are only an aid to understanding.

FIGS. 2E and 2F represent the operation of a third variant of the invention.

FIGS. 4A and 4B represent the operation of a fifth variant of the invention.

FIGS. 5A and 5B represent in detail a sixth variant of the invention.

FIGS. 6A and 6B represent in detail a seventh variant of the invention.

FIG. 7A represents a variant with the simplest retention device, according to the invention.

FIG. 7B represents another variant with a simplified retention of the device according to the invention.

FIG. 8 represents a view of the invention under cutaway procedure conditions.

FIG. 11D shows the same variant of the invention during the reserve only deployment.

FIG. 15A represents different views of an advanced arrangement of the fastening loop(s) within the rigid plate.

FIG. 16 represents an improvement of the reserve container top flap.

DETAILED DESCRIPTION OF THE INVENTION

Figure 1:
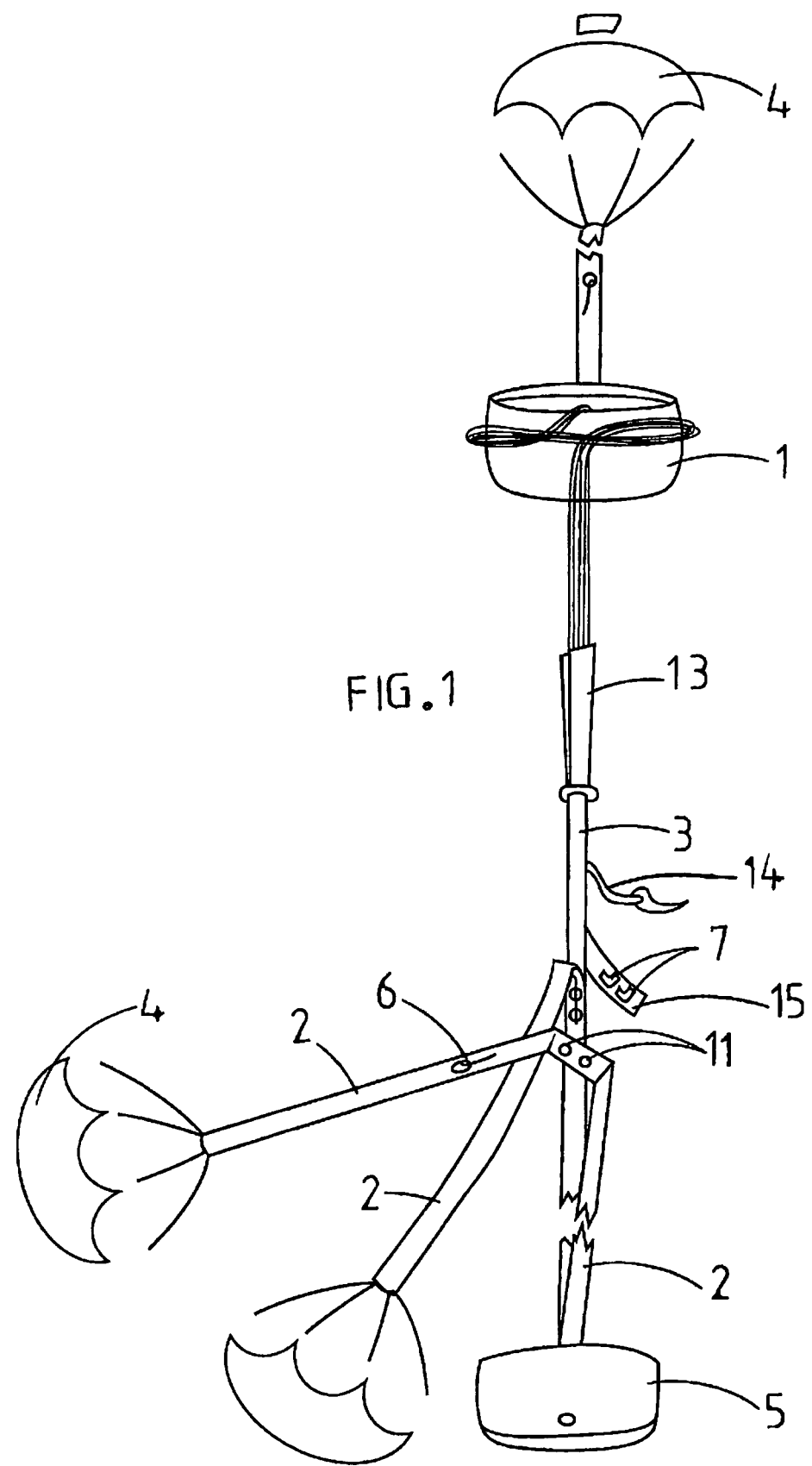
FIG. 1 represents a front view of the device of the prior art within its operational limits.

The FIG. 1 represents the limitation of the prior art device, when a lack of retention on the connection between the reserve bridle 2 and the lanyard 3 results in the disconnection of the interlock device, while it is operating in a cutaway situation.

The main parachute 1, once cutaway represented in its deployment bag, is connected to a lanyard 3, also called the RSL bridle, via a riser group 13.

When the reserve bridle 2 and the lanyard 3 are not connected in a secure way, for instance because of a loosening during the stowing of the closing pin 6, into the loops 7 of plate 15, the pulling into full tension of the lanyard 3 causes only the opening of the reserve container 22, without lifting the reserve deployment bag 5. In this way, the lack of retention means of the prior art interlock devices allowed the separation of the lanyard 3 and the reserve bridle 2, the device no longer functioned and the saving of time/height in the reserve opening has not been ensured. In this way, the reserve deployment bag 5 is lifted out of the reserve container 22 only under the effect of the reserve pilot chute 4, meanwhile the connection means are untimely disconnected and the risers groups 13 and the lanyard 3, come away from the reserve bridle.

Description of the device according to the invention, represented in FIG. 8:

In accordance with the invention, the reserve bridle 2 is divided into two parts. The upper portion, situated between the reserve pilot chute 4 and the connection between the reserve bridle 2 and lanyard 3 and the lower portion, situated between the aforementioned connection and the deployment bag 5.

Advantageously, the reserve bridle 2, is attached to the lanyard 3 more than half way along its length, such that it is closer to the reserve pilot chute 4 than the reserve deployment bag 5, so that, during the cutaway of the main parachute, the reserve pilot chute 4 cannot become entangling with the lines of the reserve parachute.

The reserve bridle 2, which connects the reserve pilot chute 4 with the reserve deployment bag 5, is equipped with at least one closing pin 6 and at least one grommet 11.

Advantageously these items are fixed onto the upper half of the reserve bridle 2.

The lanyard 3 includes, at one end (E1), a means of attachment to a riser group 13, in a middle part a connection to a means of opening 14, of the reserve container, and includes at the other end (E2) the connection means to the reserve bridle 2, that has at least one fastening loop 7, arranged to be locked by the closing pin 6.

During the main parachute cutaway procedure, the tensioning of the lanyard 3 causes the tensioning of the means of opening 14, extracting the locking pin of the reserve container 22, allows its opening and the freeing of the reserve pilot chute 4.

Advantageously, the fastening loop 7, goes under the reserve bridle 2, passes through a grommet 11 set into the reserve bridle 2, before being captured by the closing pin 6, which is held in the locked position by the retention means 8 and 9, which is the first particularity of the invention.

As represented on FIG. 8, the retention means 8 and 9 ensure the connection of the interlock device during the cutaway procedure, which contributes to making the reserve pilot chute 4 redundant.

It is advantageous to foresee that the fastening loop 7 is positioned on plate 15.

It is possible to position two fastening loops 7 on the plate 15. The fastening loops 7 can be made of textile materials. The fastening loops 7 can pass through the plate 15 in a textile or metallic envelope or be attached directly to it.

The fastening loops 7 can be arranged as a free running loop in the plate 15 in order to ensure better retention for the interlock device during the cutaway procedure.

On the other hand, in a non-represented variant, for an easier length adjustment, the fastening loops 7 can be made as a single adjustable loop, with two retractable ends, as is the case for the adjustable closing loops of the external pilot chute parachutes.

In a more advanced embodiment of the invention one of the two fastening loops 7 can retract during the tensioning of the lanyard 3, in order to ensure better retention of the interlock device during the cutaway procedure.

The fastening loop(s) 7 are appropriately placed to line up opposite the (a) grommet(s) 11 located on the reserve bridle 2.

A rigid section can be added to the reserve bridle 2 in order to facilitate the passing of the fastening loop(s) 7 into the grommet(s) 11.

This arrangement ensures the connection of the lanyard 3 with the reserve bridle 2 and the use of a plate 15 allow the stabilization of this connection and its more reliable action.

The plate 15 can be made from two metallic pieces held together with screws.

During the main parachute cutaway procedure, after the opening of the reserve container, the jumper falling away from the main parachute causes tension in the lanyard 3, which allows the fastening loop 7, to pull the reserve bridle 2 thanks to its capture by the closing pin 6, secured by the retention means.

During the main parachute cutaway procedure, the device according to the invention, causes the extraction of the reserve deployment bag 5 and drags it out of the reserve container 22 with the cutaway main before the inflating reserve pilot chute 4, disconnects the device. Indeed, the fastening loop 7 is not freed from the reserve bridle 2 because the reserve pilot chute 4 cannot exert sufficient pulling force, to separate the retention means and retract the closing pin 6.

During the reserve only deployment (no main out), the device according to the invention, works as follows:

As soon as the drag of the reserve pilot chute 4 comes into action, it tensions the upper part of the reserve bridle 2 and exerts a force on the retention means. Beyond a predefined force threshold, the retention means releases and the closing pin 6 is withdrawn by the reserve bridle 2. The withdrawal of the closing pin 6 frees the fastening loop 7 from the lanyard 3 and it definitively disconnects from the main parachute.

From the moment the fastening loop 7 is freed, the pull of the reserve pilot chute 4 acts on the entire length of the reserve bridle 2 and lifts the reserve deployment bag 5 out of the reserve container 22.

The deployment of the reserve parachute is then under the control of the reserve pilot chute 4 in the known and conventional way.

Accordingly the following variants are represented in FIGS. 2-17.

The device according the invention includes one or several fastening loop(s) 7 on the lanyard 3 and one or several grommet(s) 11 in the reserve bridle 2, and might include one or several tunnel(s) 12 intended to guide the closing pin 6.

According to the variants represented in the FIGS. 2-4, the holding means includes at least one elastic item 10, intended to maintain the closing pin 6 in a locked position. The locking of the connection between the reserve bridle 2 and the lanyard 3 is ensured by closing pin 6. Closing pin 6 is made of a rigid material and is fastened to the reserve bridle 2 with a tab 18 through its terminal ring.

In an advantageous way, this closing pin 6 slides through a first tunnel 12, before sliding through one or several fastening loop(s) 7, of the lanyard 3, that have passed through the grommet(s) 11.

The closing pin 6 ends in another tunnel 12, of the reserve bridle 2. The elastic item 10 ensures that the closing pin 6 remains in a locked position.

Figure 2A:
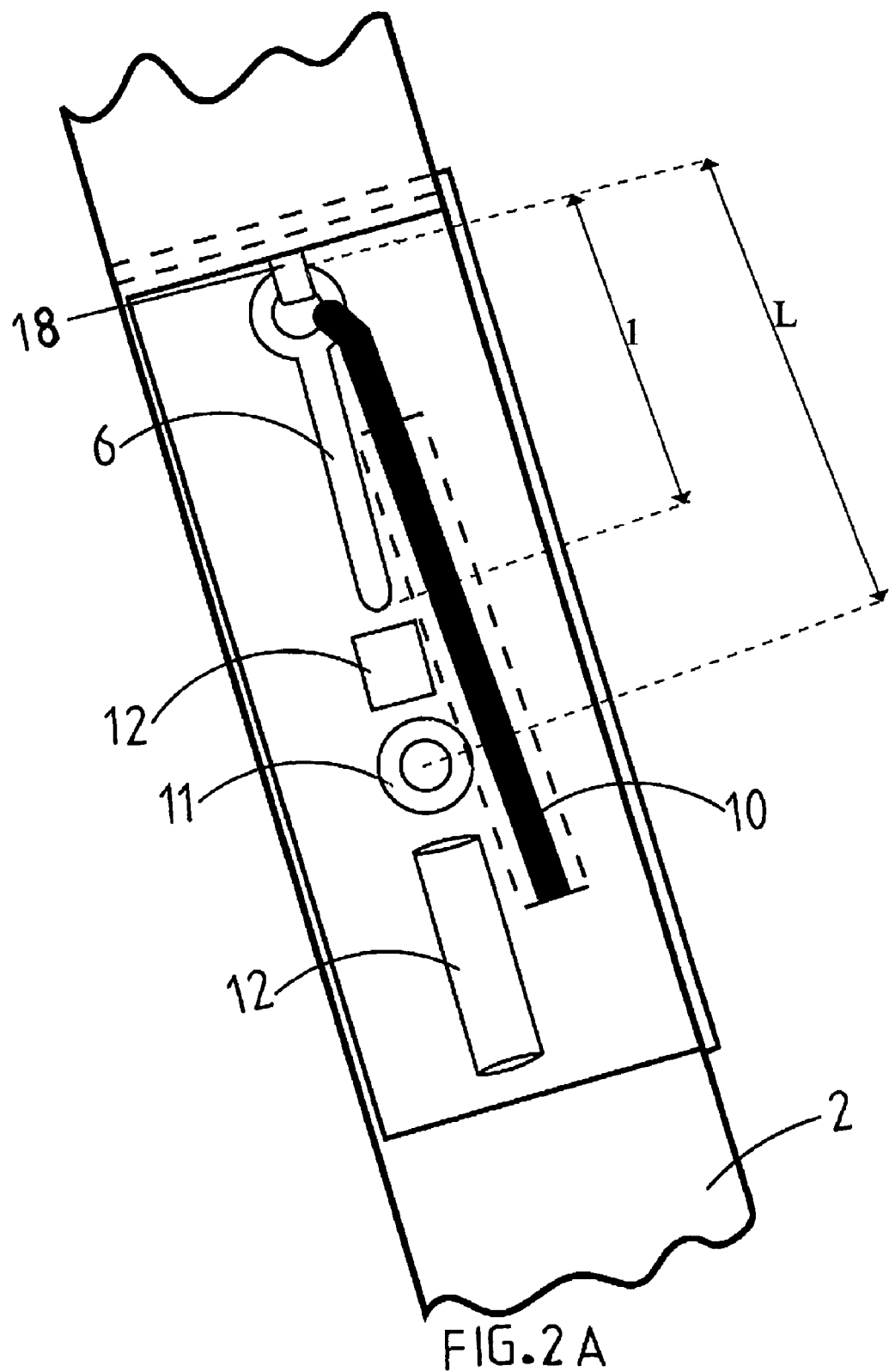
FIG. 2A represents a partial detailed view of an early variant of the invention.

According to the FIG. 2A, when the upper part of the reserve bridle 2 is tensioned as shown, the length L between the grommet 11 and the tab 18 of the closing pin 6 is greater than the length l of the closing pin 6, in order to ensure its complete clearance from the loop 7.

It is noticed that the withdrawing of the closing pin 6 out of the fastening loop 7 puts the elastic item in tension.

Figure 2B:
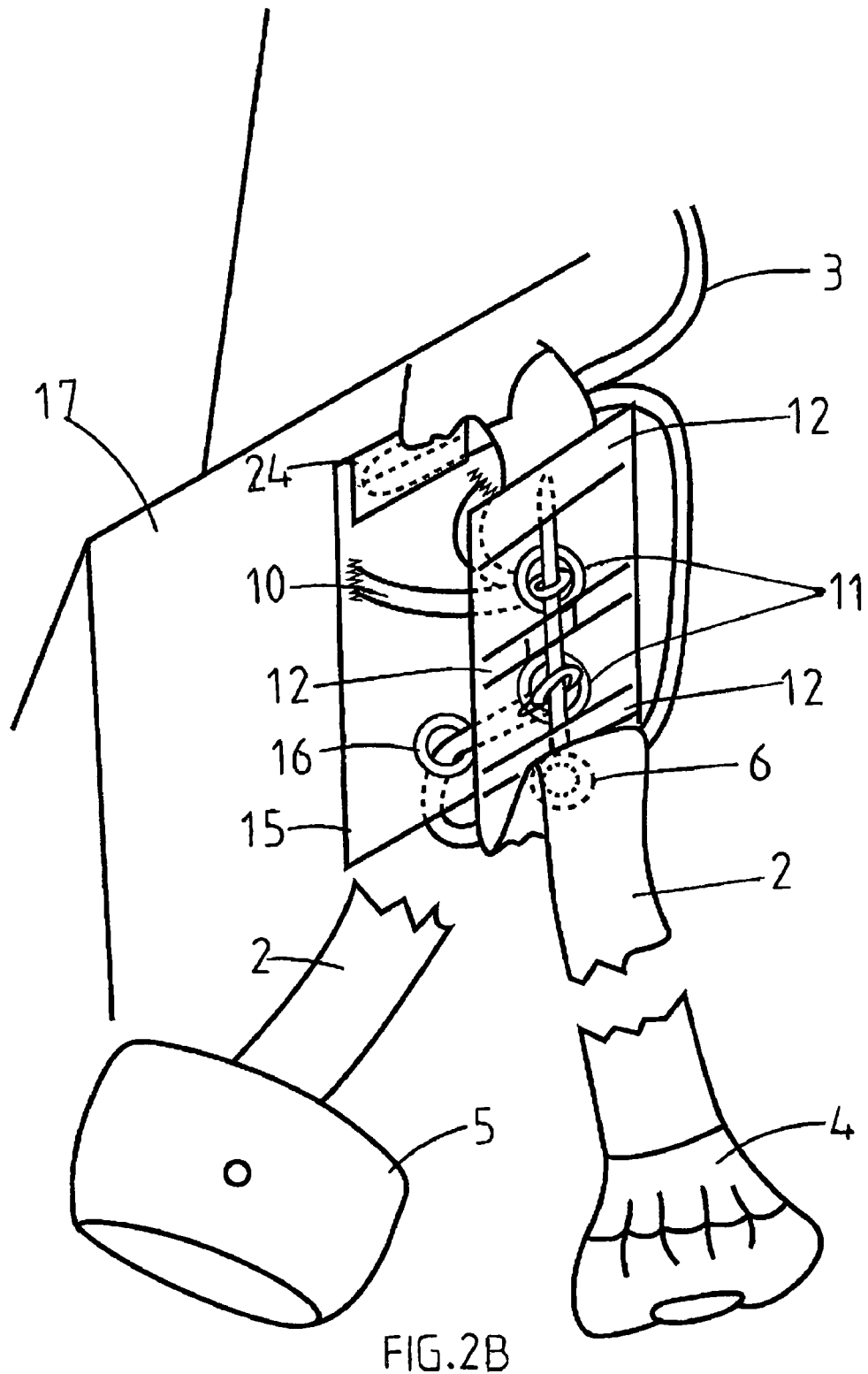
FIGS. 2B and 2C represent a detailed view of a second variant of the invention.

According to a different variant represented on FIG. 2B, the device is shown installed in the reserve container 22. In a consistent way with the invention, the reserve bridle 2 is equipped with a closing pin 6 and two grommets 11.

In this variant, the elastic item 10 acts as a fastening loop 7, which is fixed to the plate 15. Plate 15 is also equipped with a grommet 16 at one of its ends, the plate 15 is placed in a detachable way onto a holding flap 17.

The reserve bridle 2 is put on top of the plate 15, then the end E2 of the lanyard 3 is passed through the grommet 16 in the bottom of the plate 15, and then through a second grommet 11 placed in the reserve bridle 2. The locking is achieved by passing the closing pin 6 through the loop in the end E2 of the lanyard 3, which then acts as a fastening loop 7. The elastic item 10 is pulled into tension as it goes through another grommet 11 placed in the reserve bridle 2, in this way it also acts as a fastening loop 7 and then closing pin 6 passes through it, then plate 15 is placed on holding flap 17.

In this way, the tension in the elastic item 10 contributes the retention means of the closing pin 6, which locks together the reserve bridle 2 and the lanyard 3, in order that the device does not disconnect in case of cutaway.

In this variant, during the main canopy cutaway procedure, the end E2 of the lanyard 3 which forms the fastening loop 7 pulls the interlock connection, the plate 15 is separated from the holding flap 17, carrying away with it the reserve bridle 2.

Figure 2C:
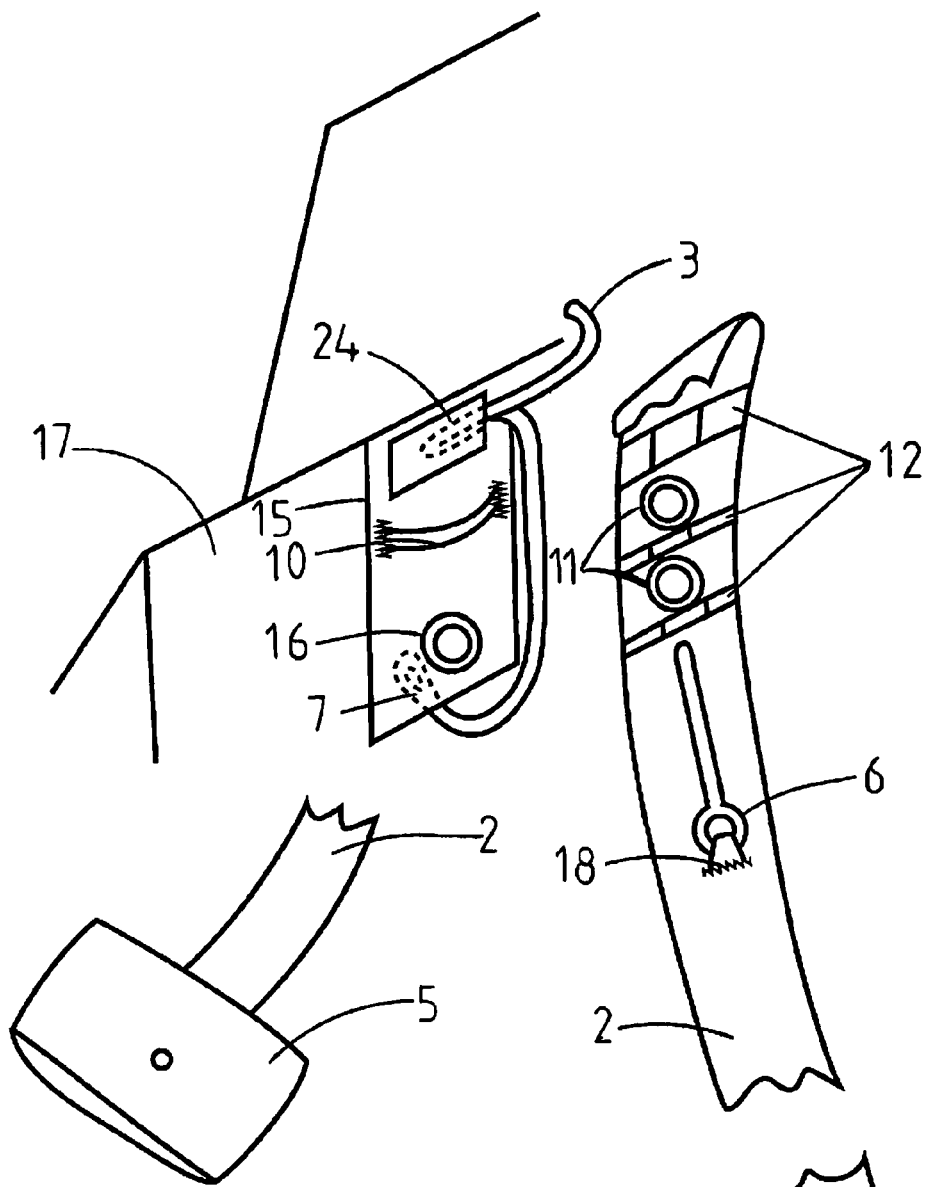

In case of a reserve only procedure (no main out) represented in the FIG. 2C, when the reserve pilot chute 4 inflates it pulls on the closing pin 6 which is removed from the elastic item 10 and then from the fastening loop 7, of the lanyard 3, in such a way that the plate 15 stays in place on the holding flap 17 and the opening of the reserve occurs in the conventional way.

The FIG. 2E represents a variant of the device, according to the invention, before it is placed on the holding flap not represented in the figure.

The closing pin 6 is fastened with a tie 27 to a connection ring 28, from where another closing bridle 29 starts.

The closing bridle 29 passes through a grommet 16 placed in the plate 15 which is fixed in a detachable way to a holding flap.

The end of the closing bridle 29 is used as fastening loop 7 after it has passed through a second grommet 11, placed in the reserve bridle 2.

The end E2 of the lanyard 3 has a terminal loop, through which passes the closing bridle 29 between the connecting ring 28 and the grommet 16 placed onto the plate 15.

The elastic item 10 that is fixed to plate 15 is pulled into tension as it goes through another grommet 11 placed in the reserve bridle 2, and then closing pin 6 passes through it, in this way, the tension in the elastic item 10 contributes to the retention means of the closing pin 6, which locks together the reserve bridle 2 and the lanyard 3, in order that the device does not disconnect in case of cutaway.

In case of a cutaway: the tensioning of the lanyard 3 pulls the closing bridle 29 until the terminal loop of the lanyard 3 comes to a stop against the connection ring 28, in this a way tension is relayed to the fastening loops 7 at the end of closing bridle 29, which helps ensure the retention of the closing pin 6.

It is noticed that the lanyard 3 could pass through the ring 28, before it encircles closing bridle 29, which does not change the function of the invention.

In case of a reserve only situation (no main out) represented in FIG. 2F, the closing pin 6 is disconnected from the fastening loops 7 and then the closing bridle 29 is free to slip through the terminal loop of the lanyard 3, the elastic item 10 retracts, the reserve bridle 2 is freed and the plate 15 stays in place on the holding flap, not represented in the figure.

It is noticed that, in accordance with the invention, the length of the tie 27 allows the entire clearance of the closing pin 6 out of the fastening loops 7.

Figure 3A:
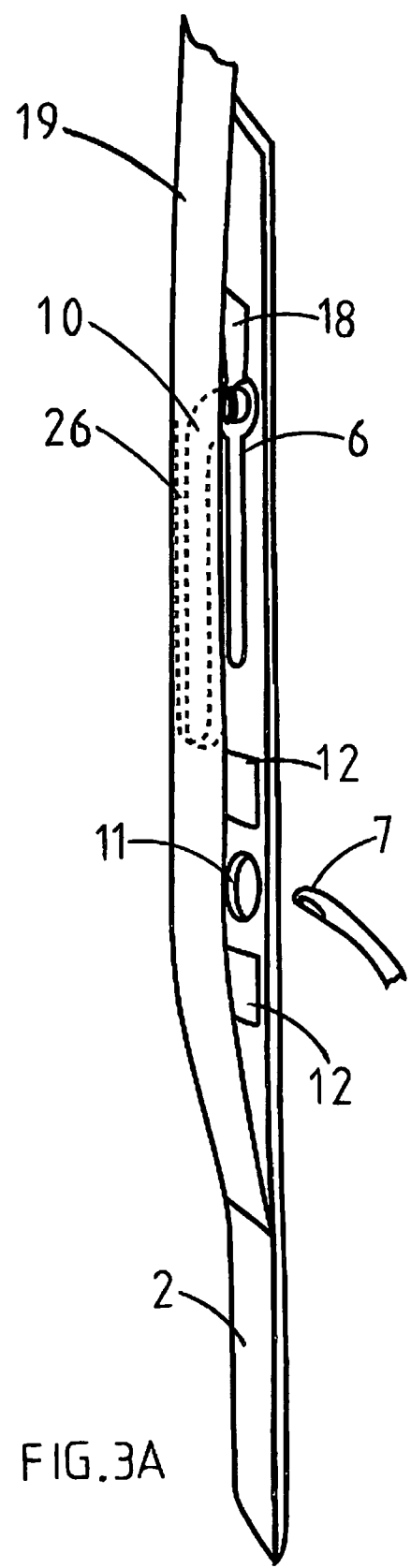
FIGS. 3A and 3B represent the operation of a fourth mode of the invention.
Figure 3B:
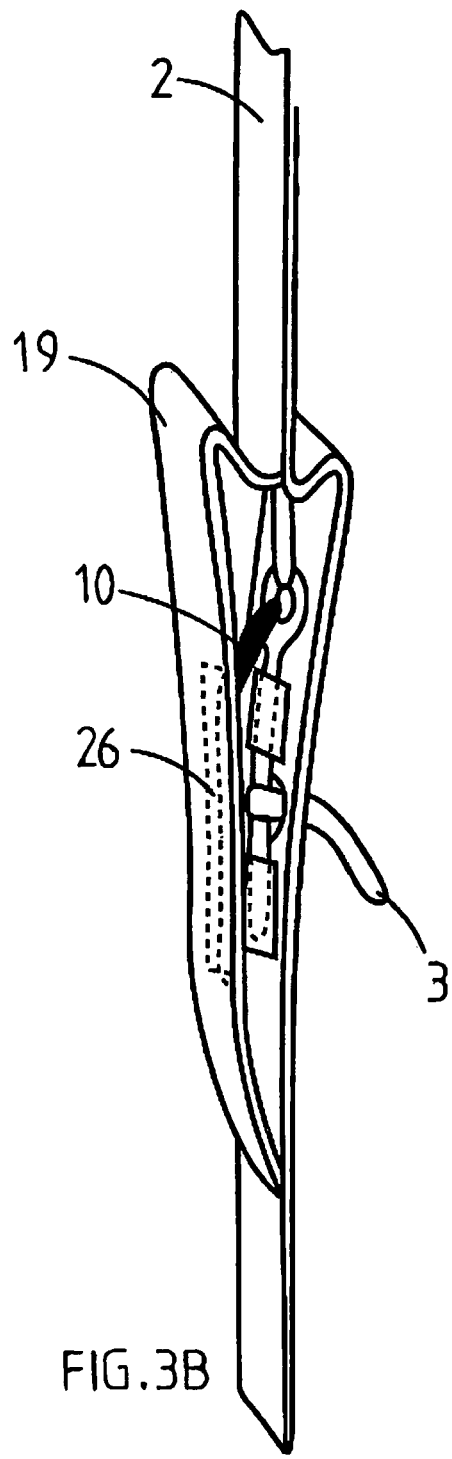

According to the FIGS. 3A and 3B representing another variant, attached to the pin side of the reserve bridle 2 there is an additional material 19, to which the elastic item 10 is fixed. The elastic item 10 then passes through a sleeve 26 attached to the additional material 19, this addition is used to protect the device.

In the FIGS. 4A and 4B, the elastic item 10 runs up on one side of the closing pin through the terminal ring of said pin and back down the other side.

Advantageously, the tunnels 12 used to guide the closing pin 6, are widened in order to form a further two tunnels to hold the elastic item on both sides of the closing pin 6. In this way, the closing pin 6 and the elastic item 10 cannot overlap.

The fixing of the ends of elastic item 10 can be achieved by sewing or with knots and bottleneck tunnels, as currently used to keep leg straps together.

In a variant of the device according to the invention, represented in the FIGS. 5 and 6, the retention means include at least a magnetic item 8 intended to maintain the closing pin 6 in a locked position.

In the FIGS. 5A and 5B, the retention means include at least one magnetic item 8 located by sewing or held in a textile envelope on the reserve bridle 2, and at least another iron/magnetic item 9, to which the magnetic item 8 is attracted, also attached to the upper part of the reserve bridle 2.

The magnetic item 8 can be a permanent magnet and the item 9 can be made of a material which is normally not magnetic, but which is attracted by the magnetic field of a permanent magnet.

Advantageously, the magnetic item 8 can be placed between the fastening tab 18 and the first tunnel 12, and iron/magnetic item 9 is placed in between magnetic item 8 and tunnel 12, in such a way that the magnetic item 8 and the iron/magnetic item 9 come into mutual contact, while the closing pin 6 captures the fastening loop(s) 7 of the lanyard 3 in order to ensure the connection of the reserve bridle 2 and the lanyard 3 in the case of a cutaway.

Of course, the arrangement of the magnetic items 8 and iron/magnetic 9 can be reversed.

The magnetic item 8 and the item 9 can also both be made of permanent magnets, which are preferably made of two complementary magnetic blocks, in the form of an assembly of paired closely packed positive and negative alternating poles, which attract when close.

One is placed with a positive magnetic field directed towards the negative magnetic field of the other item, so that the opposite poles attract each other in the known way.

According to another variant not shown in the figures, the magnetic item 8 is a permanent magnet, placed in a textile envelope and sewn or stuck onto the reserve bridle 2, in a location such that it comes into contact with the closing pin 6, when the aforementioned pin is in a locked position.

According to this possibility, the closing pin 6 is made of a material which is attracted by the magnetic item 8, such that it is held in place while remaining detachable.

The FIGS. 6A and 6B show a magnetic item 8, placed onto the upper part of the reserve bridle 2 and an iron/magnetic item 9, placed onto its lower part, below the connection of the reserve bridle 2 and the lanyard 3.

In this way, while the magnetic item 8 is in contact with the iron/magnetic item 9, the reserve bridle 2 takes the form of a protective flap, protecting the connection of the reserve bridle 2 and the lanyard 3.

A variant represented in FIG. 7A shows another way to ensure the connection of the reserve bridle 2 and the lanyard 3 in case of cutaway.

The means of retaining the closing pin 6 in its locked position is the use of one or several break tie(s).

The break tie, shown in the FIG. 7A passes through lower holding location 30 and upper holding location 31 before being tied with a knot 42. Holding location 30 & 31 together ensures that the reserve bridle 2 and the lanyard 3 remain connected until the break tie breaks.

Another retention means that could be used to retain the closing pin 6 in it's locked position, until the reserve pilot chute 4 inflates, and ensures the disconnection of the reserve bridle 2 from lanyard 3, is the use of touch fastener material. Attaching touch fastener on the reserve bridle 2, as shown in the FIG. 7B, in order to maintain points 30 and 31 in contact thus ensuring the connection between the reserve bridle 2 and the lanyard 3 in case of cutaway.

Note any other temporary adhesive means, of sufficient strength which allows disconnection in case of reserve only at the appropriate level of force may be employed.

For example, snaps, wax, break cord tacking, Velcro (touch fastener material), buttons, glue (adhesive chemicals or compounds such as silicone or latex caulk with the correct adhesive properties).

In order to prevent interference between the reserve bridle 2 and the lanyard 3, during a reserve only deployment, the device needs to be restrained.

A temporary attachment of the interlock to a flap is foreseen, touch fastener material would be an example, other holding means are possible, some examples are given in the represented figures.

Figure 9:
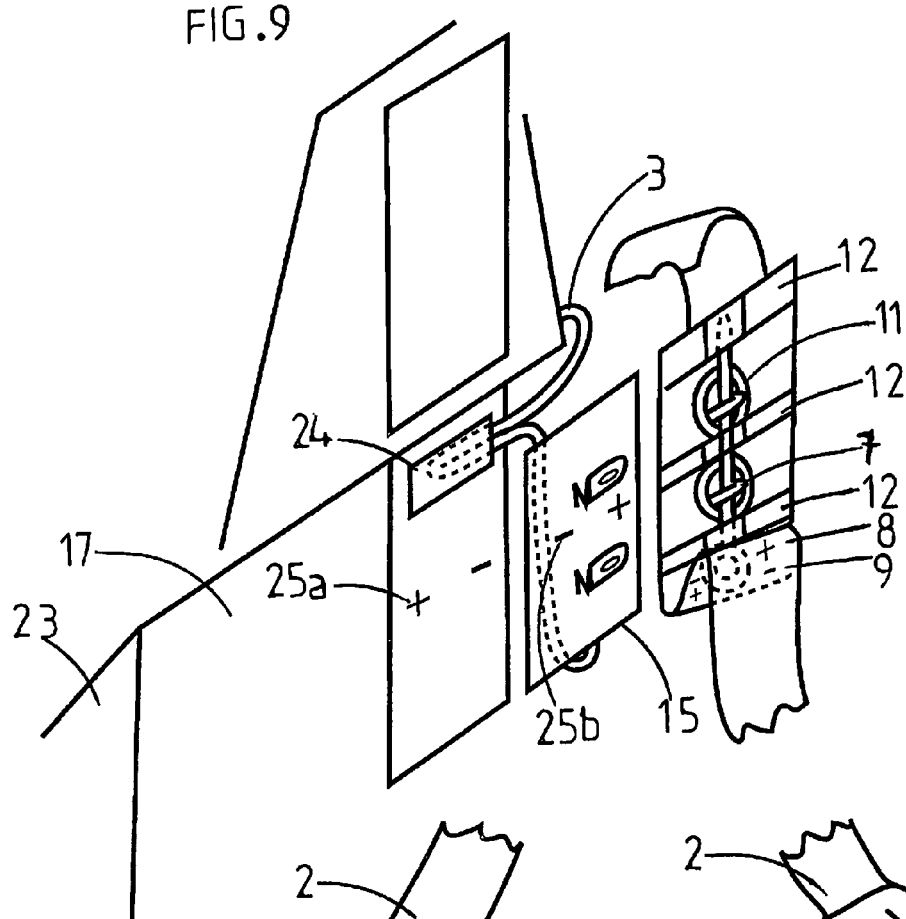
FIGS. 9 to 11 represent an installation of the invention in the reserve container and its operation.
Figure 10:
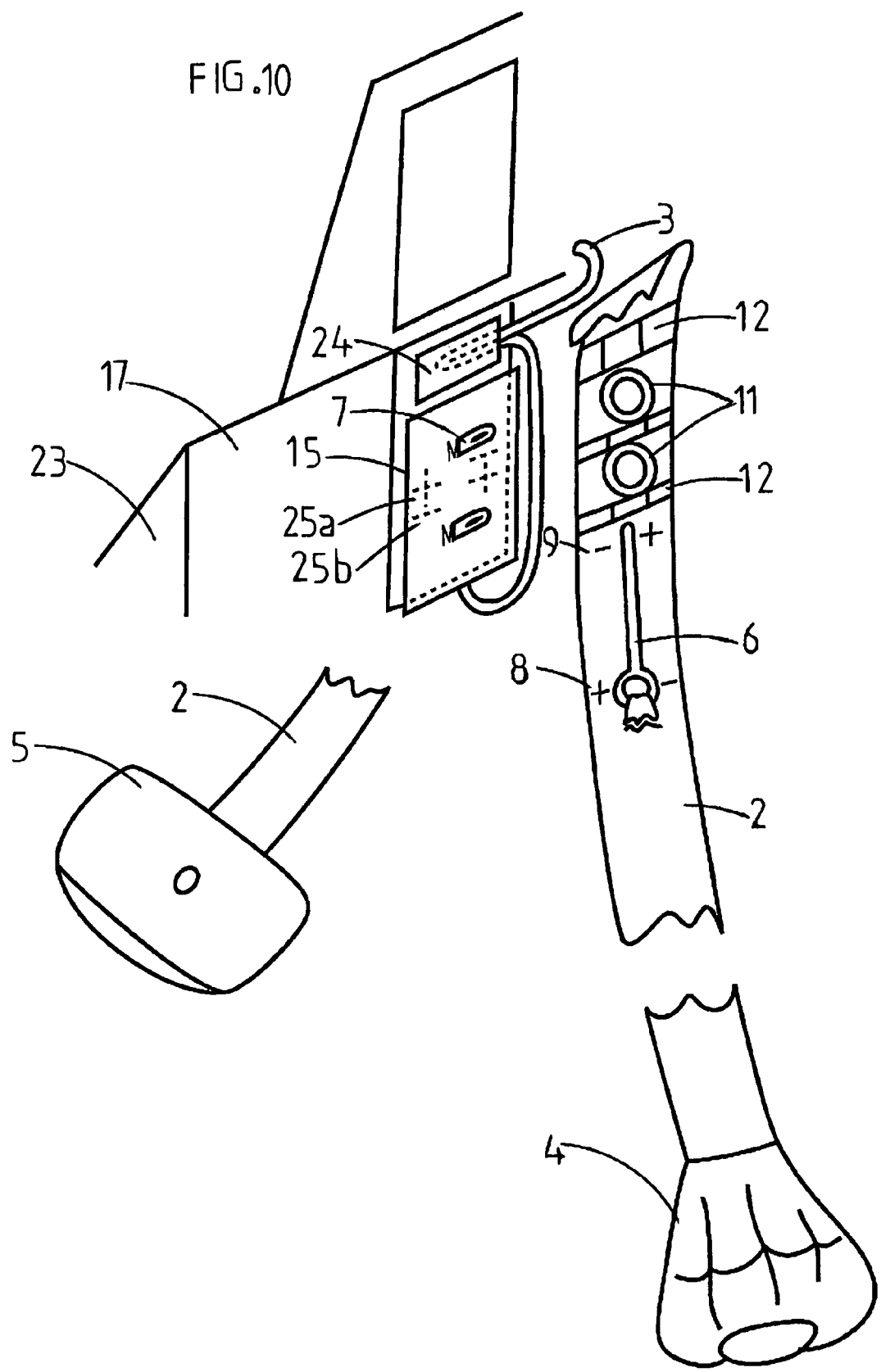
Figure 11:
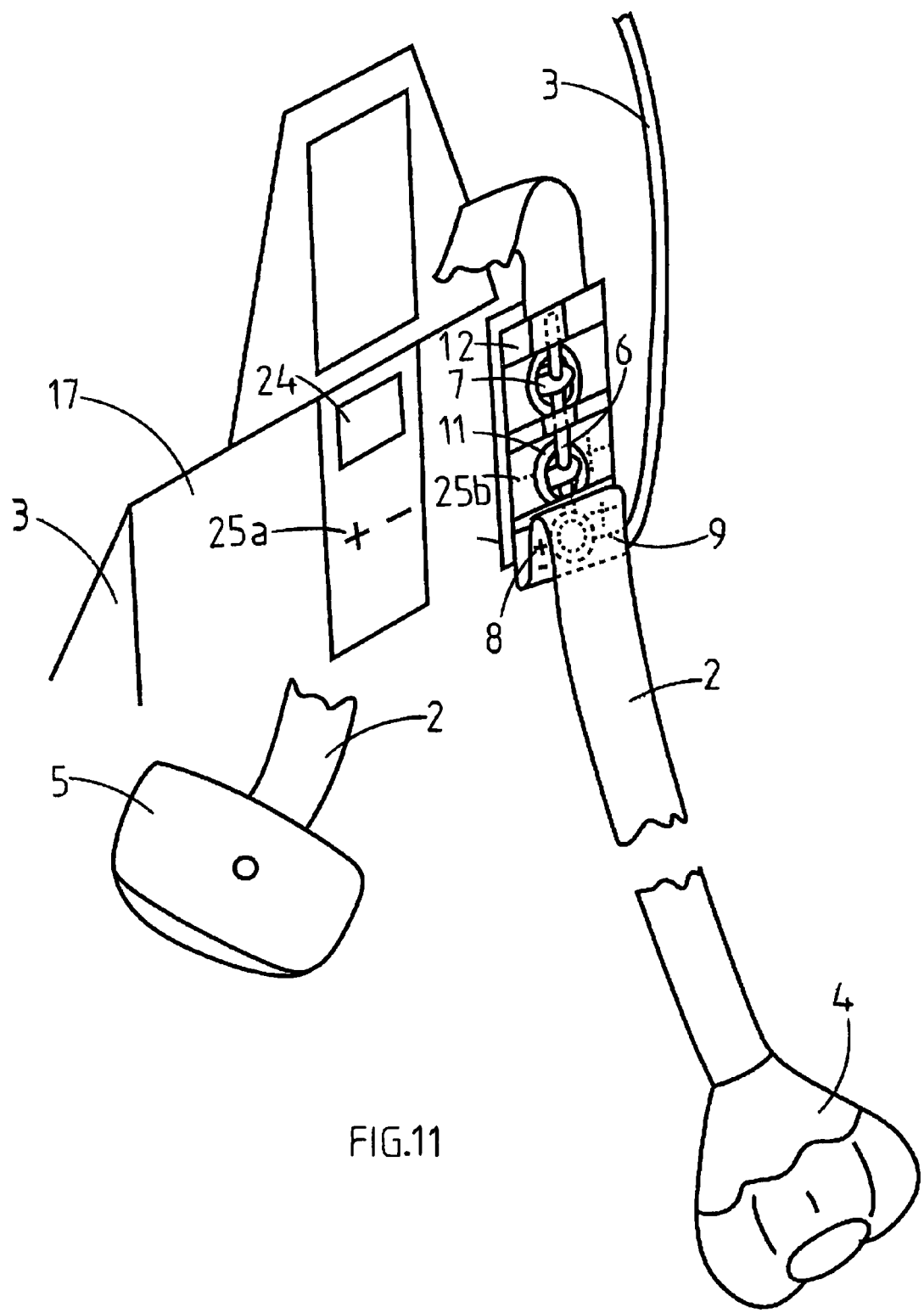

In the FIGS. 9 to 11, the device is represented attached to flap 17 and packed into a reserve container 22. The FIG. 9 shows how the device is set up and its placement on the holding flap 17.

Advantageously, the holding flap 17 of the reserve container 22 includes a holding item 25a, for instance, a magnetic material which is sewn or stuck to it, and the plate 15 which includes a holding item 25b, arranged to be attracted by the holding item 25a, such as a iron/magnetic item in a textile envelope held by sewing or sticking.

Advantageously, as represented in FIG. 10, the plate 15 can be attached to the holding flap 17 by magnetic attraction of the holding item 25a and holding item 25b.

In this way, the plate 15 of the device, according to the invention, is maintained in place on the holding flap 17 of the reserve container 22. Inversely, it can be considered that the holding item 25a is iron/magnetic and placed onto the holding flap 17 and that the plate 15 is made with a holding item 25b made of a magnetic material.

In each case, the magnetic attraction between plate 15 and the holding items 25a and 25b on the flap 17 should be stronger that the magnetic attraction between holding items 8 and 9 on reserve bridle 2, in order to ensure the latter items will disconnect in case of reserve only deployment while the adhesion of the plate 15 onto the holding flap 17 is ensured as shown in the FIG. 10.

In case of cutaway, the pulling force of the main canopy, can easily overcome the magnetic attraction between the plate 15 and the holding flap 17, as shown in the FIG. 11.

Figure 11B:
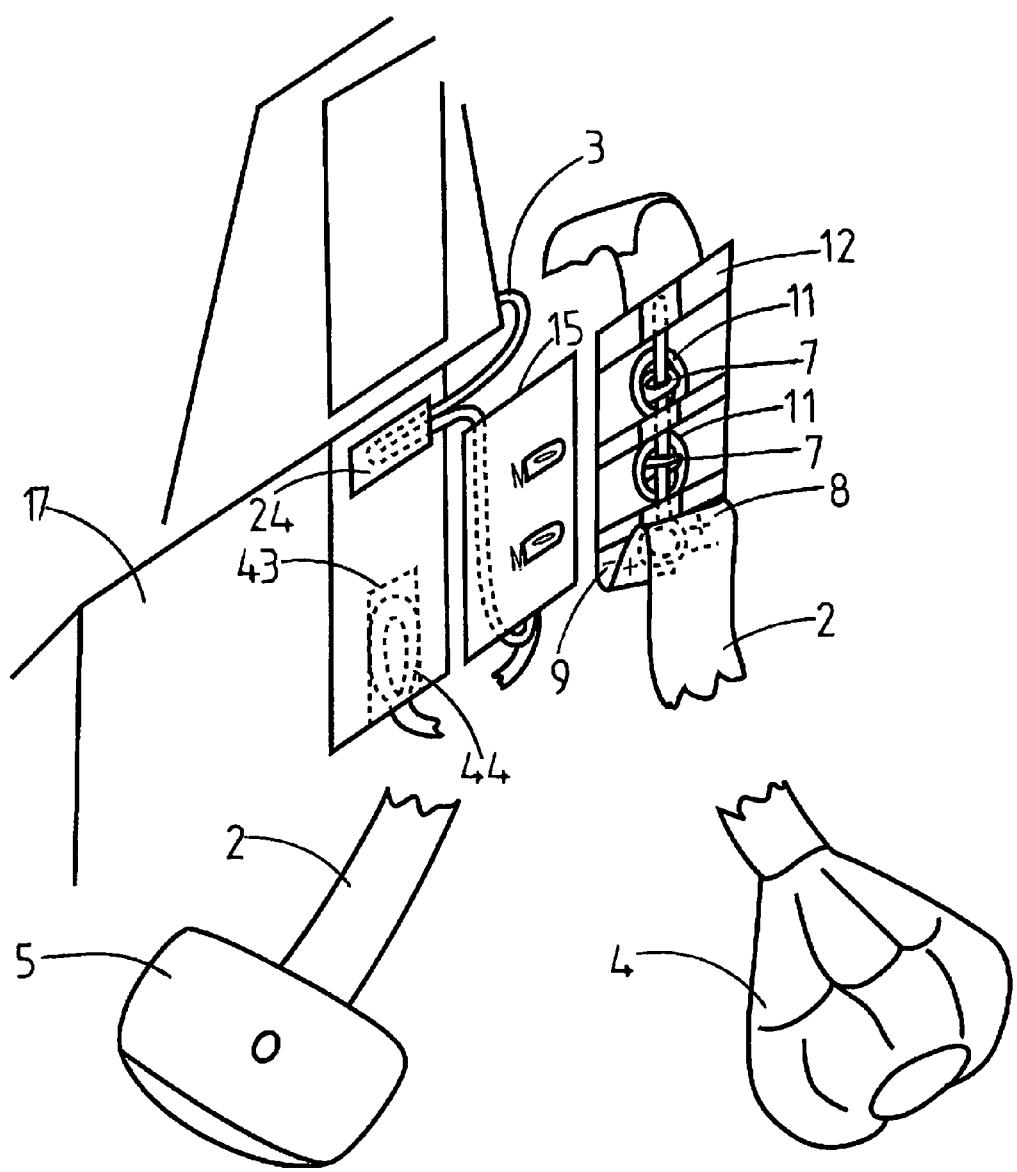
FIG. 11B shows a variant of the installation of the invention during the assembly in the reserve container.

Other temporary fixing possibilities can be considered, for instance, touch fastening material or a combination of touch fastening material and magnets or, as shown in the set up of the device represented in FIG. 11B, by means of an elastic loop 44, fixed to the plate 15, which is restrained in a housing pocket 43 placed onto the holding flap 17.

Figure 11C:
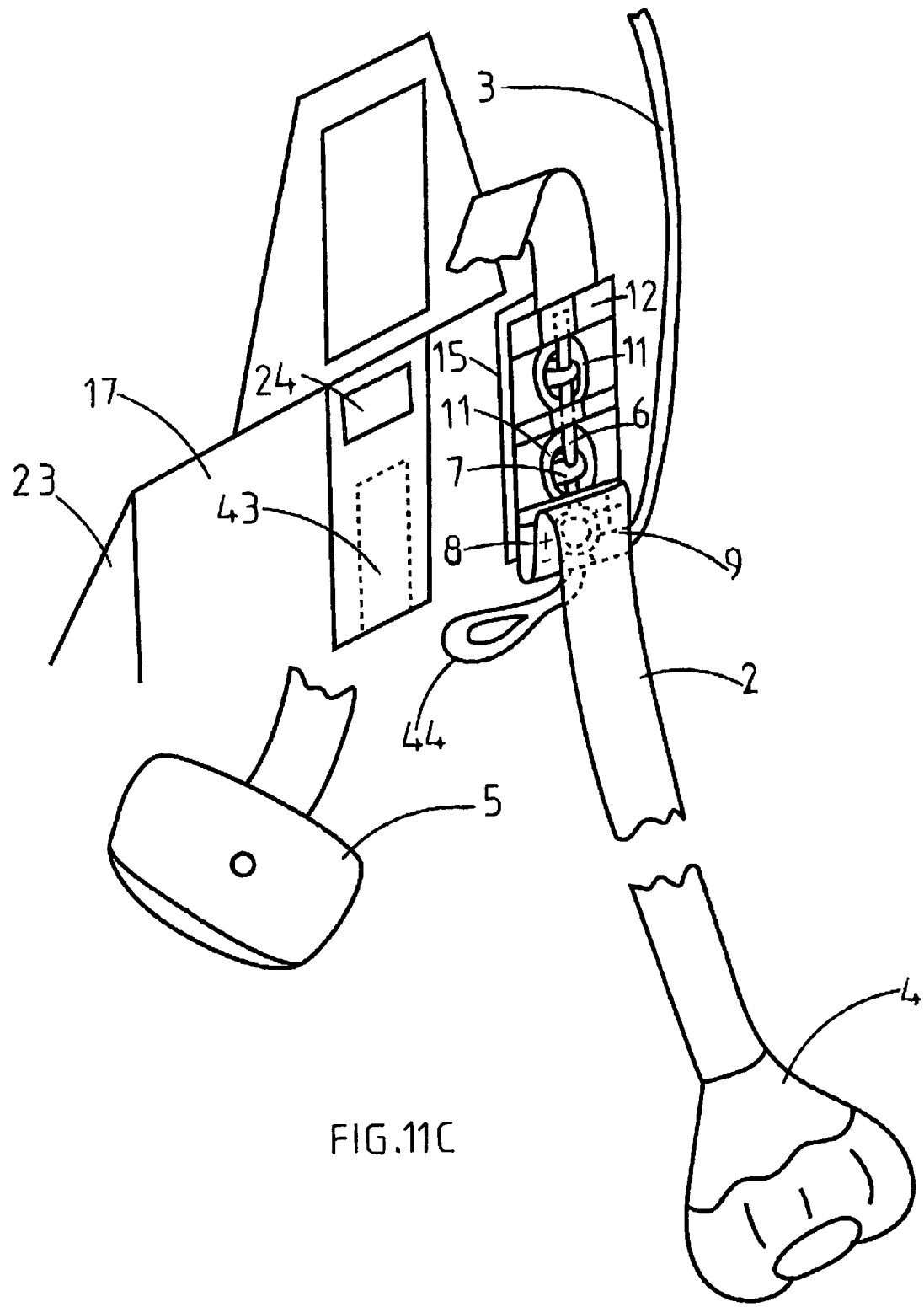
FIG. 11C shows the same variant of the invention under cutaway procedure conditions.

So that, as shown in the FIG. 11C, in case of cutaway, the pulling of the lanyard 3 is able to free the elastic loop 44 from its housing pocket 43 because the pulling force of the lanyard 3 is stronger than the resistance of the elastic loop 44 in its housing pocket 43.

In case of a reserve only deployment (no main out) as represented FIG. 11D, the pulling of the reserve pilot chute 4 uses the higher resistance of the elastic loop 44 in its housing 43, to release the retention means 8 and 9, allowing the withdrawal of the closing pin 6 out of the fastening loop 7 of plate 15, while this latter stays in place on the holding flap 17.

Note: this variant allows, the orientation of the interlock device in any direction in case of reserve only deployment.

Figure 12:
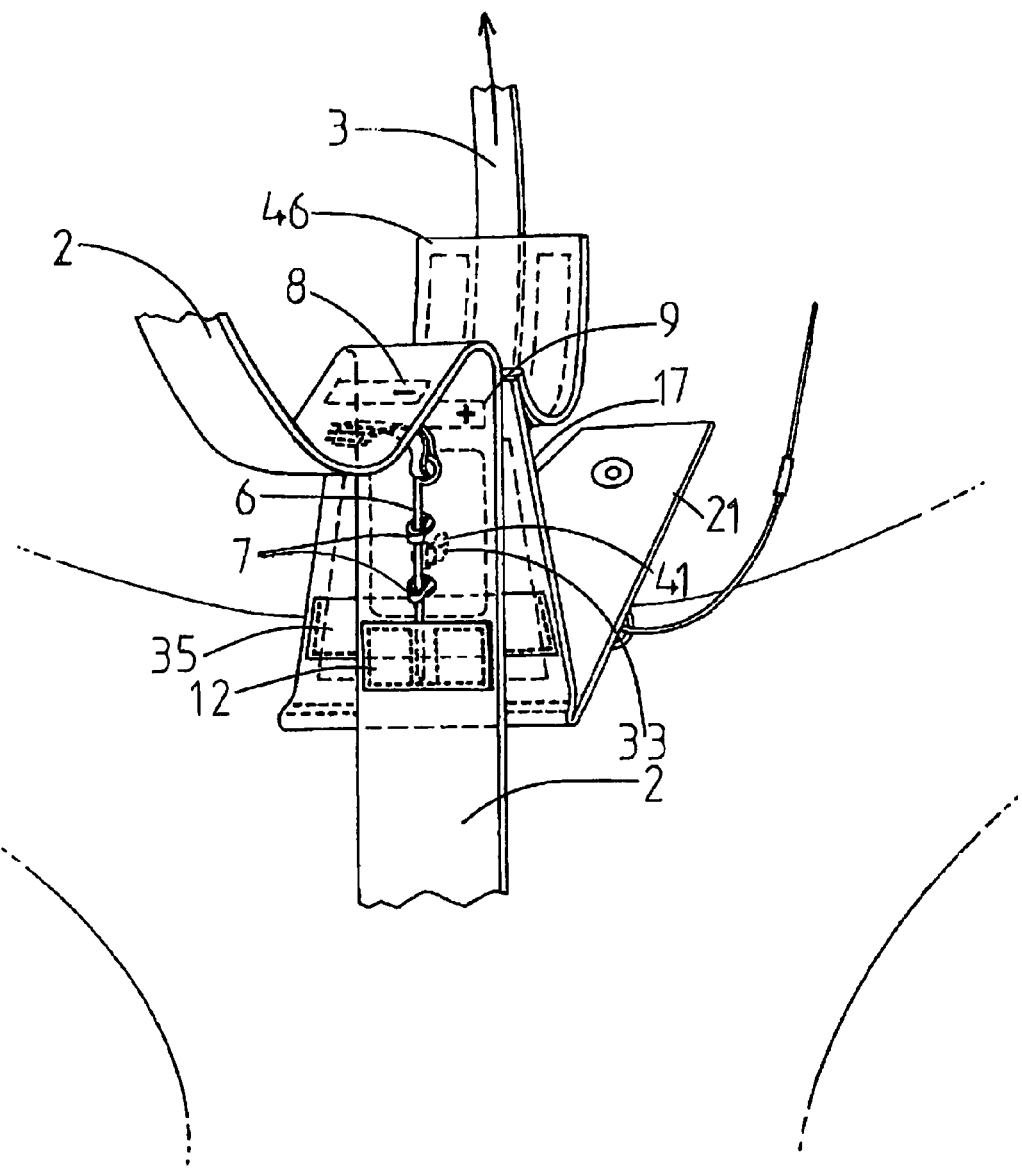
FIG. 12 represents the installation of the preferred embodiment in the reserve container.

The advanced and preferred variant represented FIG. 12 shows the placement of the interlock device onto the holding flap 17.

The preferred variant of the invention is obtained in associating; a closing loop 33 fixed to the plate 15, a grommet 41 placed in the holding flap 17 intended for the passage of the aforesaid loop 33 and one holding pin 34 allowing, in case of a reserve only deployment, the free rotation of the plate 15. Thanks to the loop 33, plate 15 is free to rotate in any direction, in case of reserve only deployment.

In this preferred arrangement of the invention, the plate 15 has an additional loop 33, which passes in the opposite direction with regards to the fastening loop(s) 7.

The arrangement of the lanyard 3 includes, a holding pin 34 and a pin cover 46 located between the plate 15 and the connection to opening means 14. The attachment ring of holding pin 34 passes round the lanyard 3, above stop B which is placed above the connection point of the lanyard 3 and the plate 15.

Figure 15B:
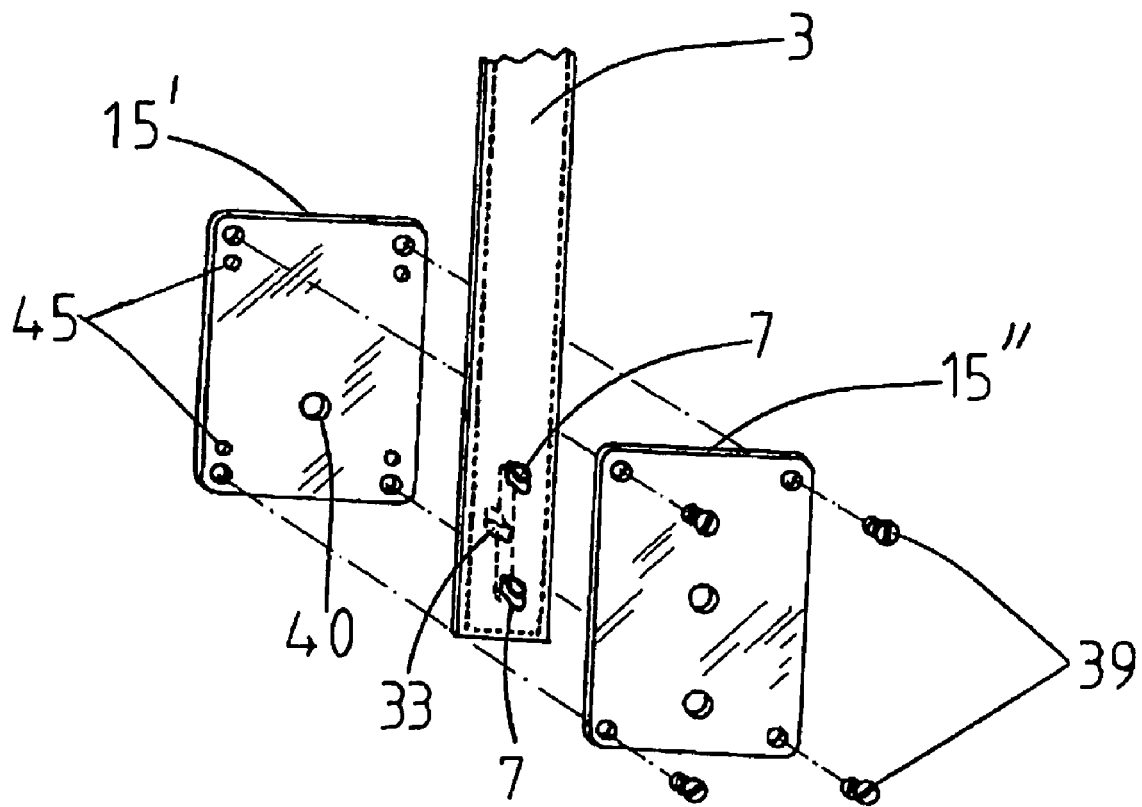
FIG. 15B represents an advanced variant of the rigid plate, according to the invention.
Figure 15C:
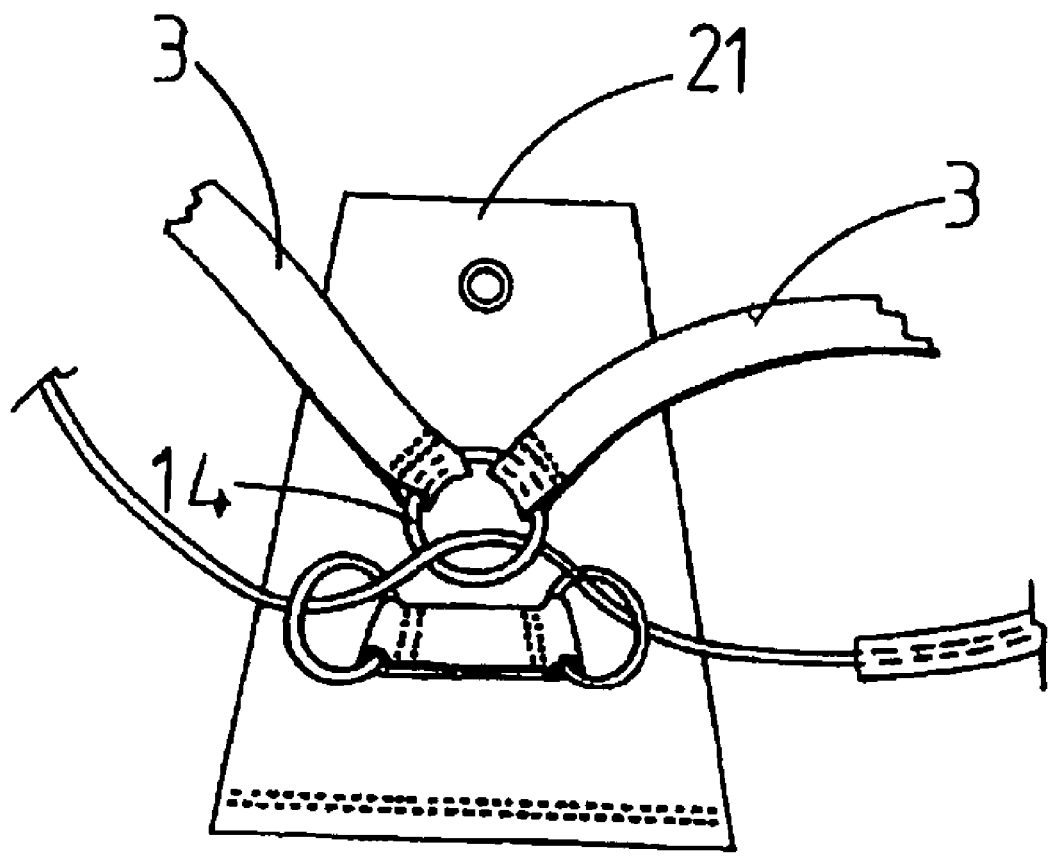
FIG. 15C represents one way to attach the lanyard to the reserve opening means.
Figure 15D:
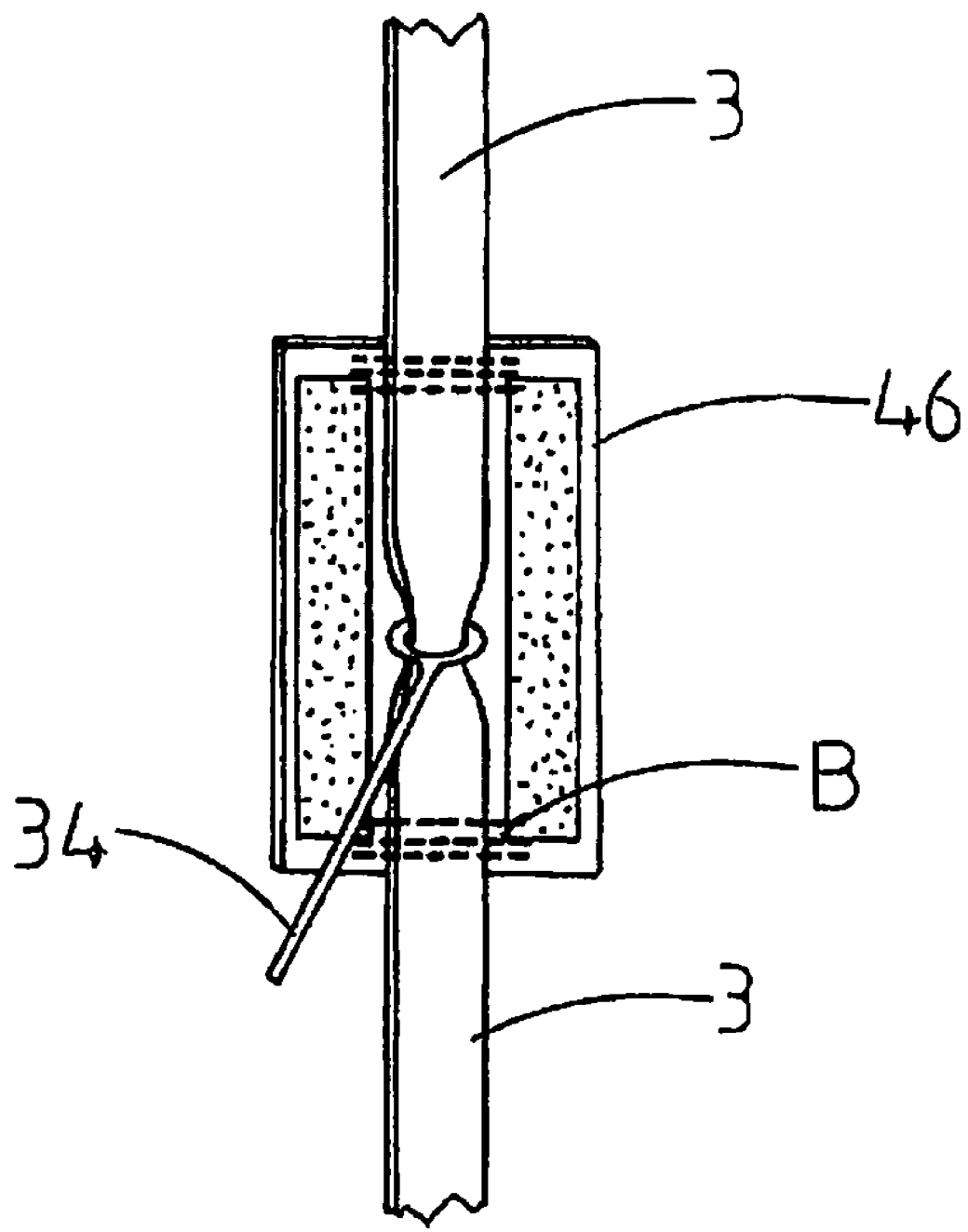
FIG. 15D represents a detail of the FIG. 12.

The FIG. 15D shows in detail one of the attachment modes of the holding pin 34 onto the lanyard 3 with it restrained between the two stitch patterns of the pin cover 46.

Note the holding pin 34 can also be fixed to the lanyard 3 without leaving it free to slide along the lanyard 3.

In the case of reserve only deployment the role of holding pin 34 is to maintain the attachment of plate 15 onto holding flap 17 in a flexible manner. This is done by means of a loop 33, that passes through grommet 41 in holding flap 17 to the side opposite plate 15, where it is captured by holding pin 34.

This flexible attachment allows the rotation of the plate 15 around the axis of the loop 33 so that the pilot chute 4 can most easily withdraw holding pin 6 and release the connection between the reserve bridle 2 and the lanyard 3.

A protective pocket 35 prevents any part of the reserve bridle 2 lodging under the plate 15, thus eliminating this interference risk during reserve parachute deployment.

Figure 13:
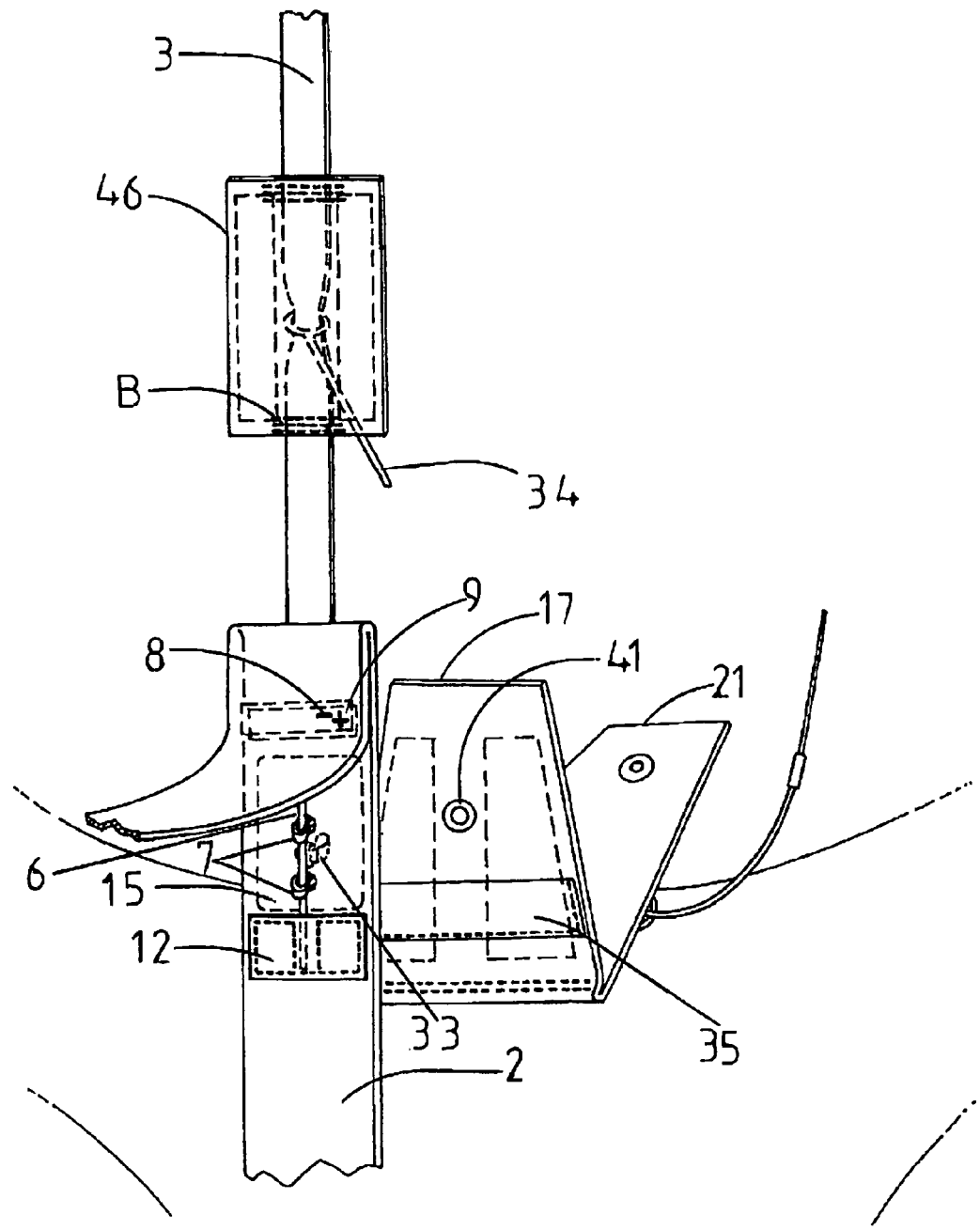
FIG. 13 represents the preferred embodiment during the cutaway procedure.

During the main parachute cutaway procedure the arrangement as represented in the FIG. 13 works as follows:

After the opening of the reserve container 22, the jumper falls away pulling the lanyard 3 from inside the reserve container 22.

This lanyard 3 slides through the ring at the terminal end of the holding pin 34 until it reaches stop B, when holding pin 34 is extracted but remains linked to the lanyard 3. This action frees the interlock device from its attachment to holding flap 17, so that the lanyard 3 is able to pull the reserve bridle 2 and lift the reserve deployment bag 5 more quickly thanks to the higher pulling force of the main parachute.

Figure 14:
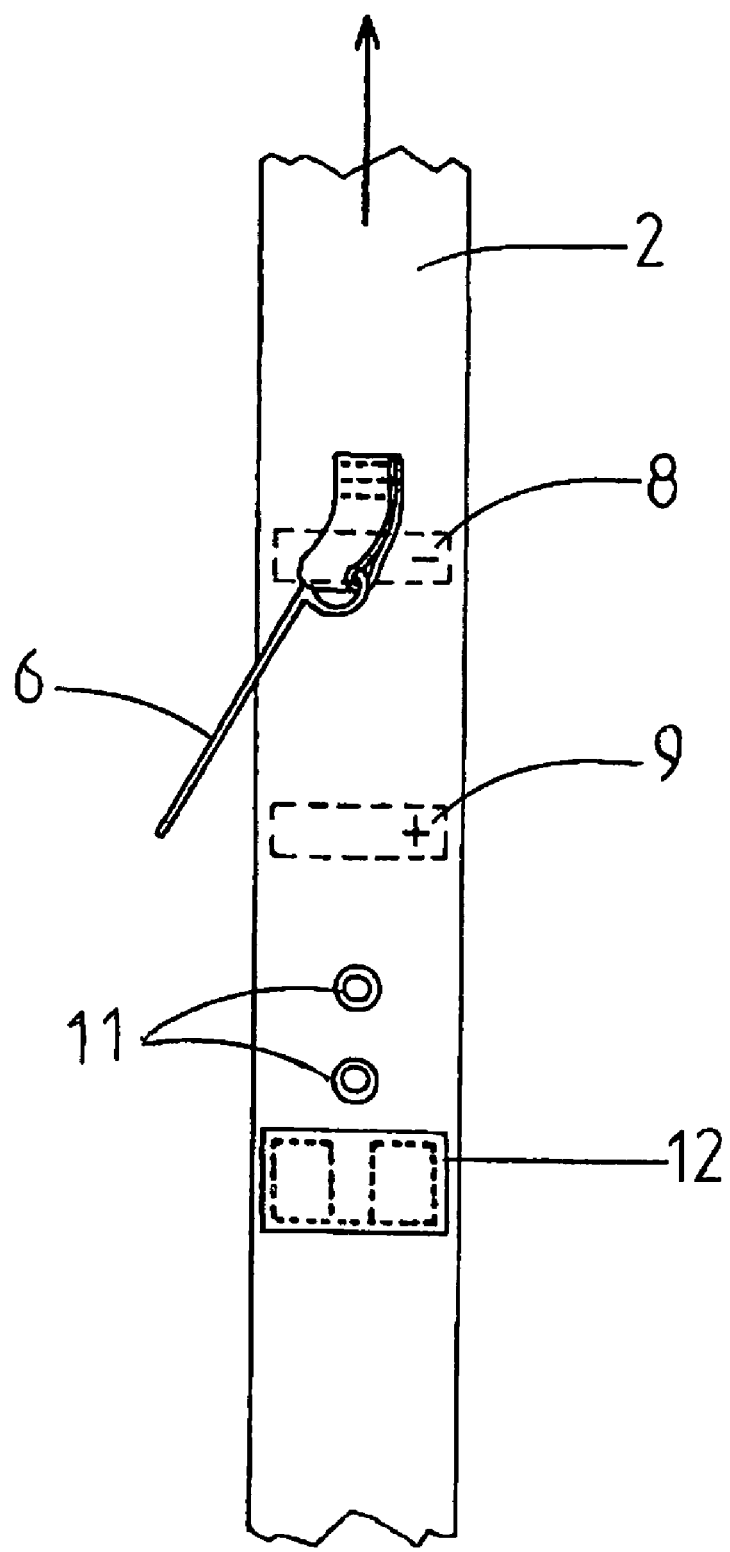
FIG. 14 represents the disconnection of the preferred embodiment during the reserve only deployment.

In case of reserve only deployment, as represented on FIG. 14, when the reserve pilot chute 4 pulls into tension the upper part of the reserve bridle 2, the interlock system is solicited so that they takes on an axial orientation relative to the reserve pilot chute 4. In this way, the reserve pilot chute 4 can pull from any angle, and the retention means 8 and 9 are always overcome with minimal force and closing pin 6 extracted, releasing reserve bridle 2, because the interlock system composed of the plate 15 and the closing pin 6 which captures the two fastening loops 7, can rotate around the loop 33, to follow the axis orientation of the reserve pilot chute 4.

In the FIG. 15A, a sophisticated variant of plate 15 is represented. Plate 15 is shown from the; side, front, and back.

The top figure in FIG. 15A represents the plate 15 viewed from the side, with the part intended to lay in contact with holding flap 17 being called the lower half plate 15'. The upper half plate 15" is intended to be fixed on top of the lower half plate 15' with screws 39.

The central figure in FIG. 15A, shows a front view of the plate 15, through which the lanyard 3 is free to slide, between orifices 37 and 38.

As represented on the first 2 drawings of FIG. 15A, the terminal loop of the lanyard 3, forms the fastening loop 7, which is not linked to the plate 15 but is free to slide between orifices 37 and 38, before passing through a grommet 11 located in the reserve bridle 2, in accordance with the invention. In this way, during the cutaway procedure, the traction of the lanyard 3 pulls the fastening loop 7 into tension and so contributes to the locking of the closing pin 6.

In this variant represented in bottom drawing of FIG. 15A, the loop 33 is fixed inside the lower half plate 15' and comes out through an orifice 40, but the loop 33 could also be linked to the fastening loop 7 without changing the operating mode of the device. In the case of "reserve only", there is no additional effort to remove the closing pin 6 from the fastening loop 7 because the latter is not tensioned.

In the FIG. 15 B a variant is represented in which the two fastening loops 7 and the loop 33 are attached to the lanyard 3 from opposite directions.

The lanyard 3 is arranged between the upper half plate 15" and the lower half plate 15' which are then held apart by spacers 45, shown in FIG. 15B as separate from the fixing screws 39, but could be in the form of washers around the fixing screws 39.

The fixing screws 39, are shown passing in the opposite direction to those in FIG. 15A.

The means of guaranteeing the fixation of the lanyard 3 to the reserve container could be; a pocket housing 24 attached to the holding flap 17 or a pocket housing place anywhere inside or outside of the reserve container 22.

Other fixation means are possible, as long these means guarantee the fixation of the lanyard 3 to the reserve container by offering a higher resistance than the effort exercised for the disconnection of the reserve bridle 2 from the lanyard 3 in case of reserve only deployment (no-main out). This can also be achieved with the means used to hold the lanyard 3: Velcro (touch fastener materiel), tuck tabs, (loop around a release cable) as well as the other more usually used means: for example snaps, wax, break cord tacking, buttons, glue (adhesive chemicals or compounds such as silicone or latex caulk with adhesion properties) designed in such a way that the intended resistance, in case of cutaway, will be overcome without the disconnection of the reserve bridle 2 from the lanyard 3 occurring.

Thus with no risk of delay from a late disconnection between the reserve bridle 2 with the lanyard 3, as it is presently the case with the prior art devices in the reserve only situation, and no risk of premature disconnection between the reserve bridle 2 and lanyard 3 in the case of a cutaway situation.

In an advantageous way, the holding flap 17 can be made of the pre-existing reserve pilot chute launching flap, found on some types of harness-containers.

In this case, the holding flap 17 can be an extension of the reserve pilot chute launching flap with the device placed between the launching flap closing grommet and the end of the flap, this arrangement is advantageous because it allows the saving of an additional flap.

The device, according to the invention, works either with a lanyard 3, including in its intermediate part a means of opening 14; with a loop or a ring to open the reserve container 22 as represented in the FIG. 15C, or with a lanyard 3 including in its intermediate part a means of opening 14 with a tape locking pin closing the reserve container 22 represented in the FIG. 8, known under the name of direct connection and which equips Vector containers for instance.

The closing pin 6 can also be of a curved shape.

The special variant represented in the FIG. 16 includes an upper protection flap 21, equipped with a window 20 intended to allow visual inspection of the assembly of the device after the reserve container 22 has been closed.

Advantageously, this transparent window 20 is made from a lexan type material.

In order to assemble the device according to the invention, the reserve is packed into its reserve deployment bag 5 in the conventional way, and then this reserve deployment bag 5 is put into the reserve parachute container 22. Half of the length of the reserve bridle 2 is packed by arranging it onto the reserve deployment bag 5 under the secondary flaps 23.

Figure 17:
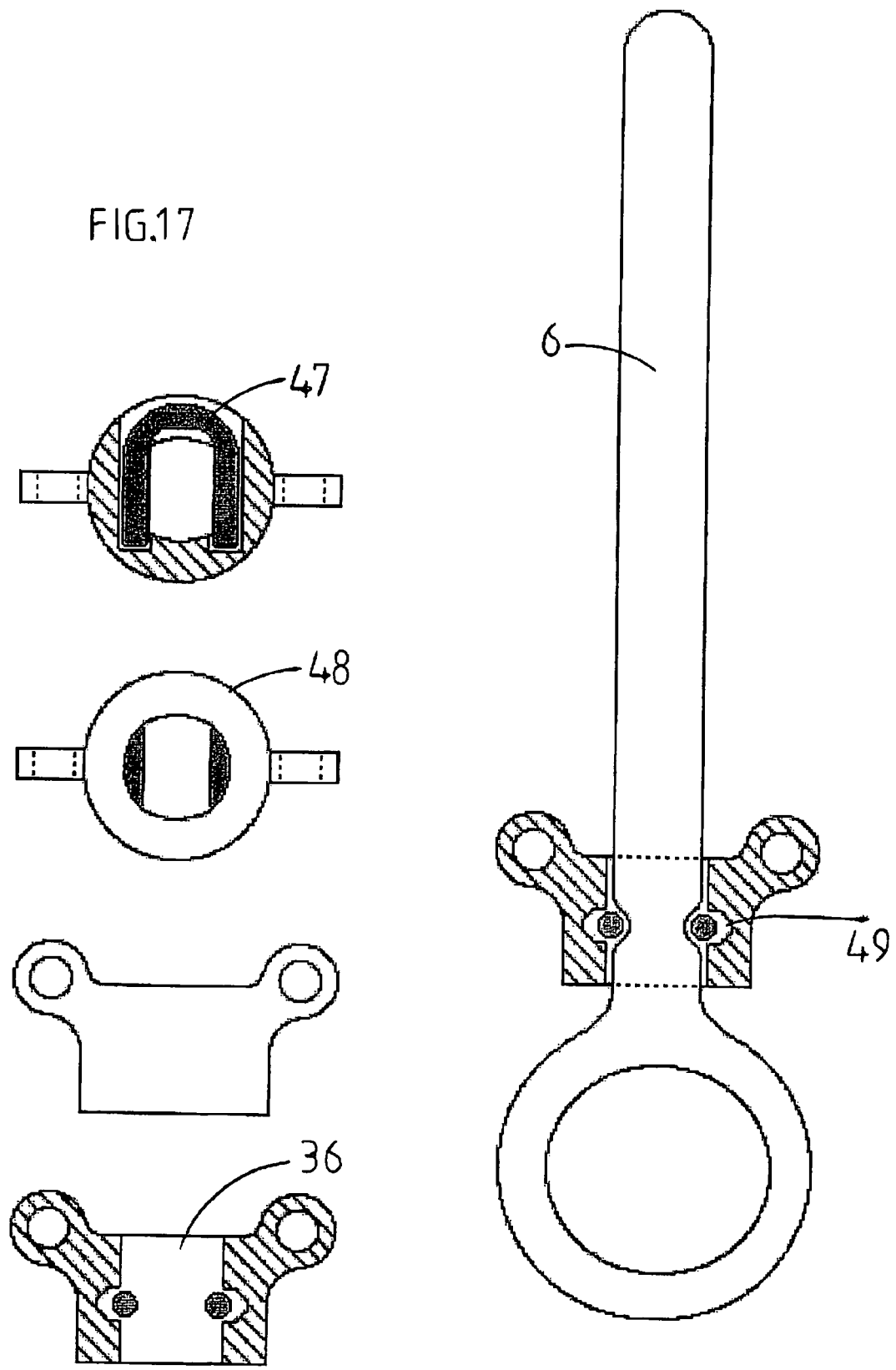
FIG. 17 shows a variant of the retention means on the closing pin.

In this variant as shown in FIG. 17, the retention means is in the form of a spring 36. The closing pin 6 has a groove 49 cut in it, into which the spring clip 47 fits. The closing pin 6 is attached to reserve bridle 2 by tab 18.

Spring clip 47 is in the form of a horse shoe, the legs of which are forced apart when sufficient pulling force is applied.

The spring clip 47 is held in a spring clip housing 48, which is attached to the reserve bridle 2 by tabs.

The spring clip housing 48 is arranged so that its axial hole is in line with and above the grommet(s) 11, of the reserve bridle 2.

The spring clip 47 is calibrated so that in the case of a cutaway the grip of the spring clip 47 in the groove 49 is enough to resist the pull of the reserve pilot chute 4, thus ensuring the connection between reserve bridle 2 and lanyard 3.

However in the reserve only situation (no main out) when reserve pilot chute 4 inflates and the upper part of the reserve bridle 2 is tensioned, there is sufficient force to force spread the legs of the spring clip 47, the retention means is overcome and the closing pin 6 withdrawn from the fastening loop(s) 7 releasing the reserve bridle 2 from the lanyard 3.

REFERENCES

1. Main parachute
2. Reserve bridle
3. Lanyard
4. Reserve pilot chute
5. Reserve deployment bag
6. Closing pin
7. Fastening loop
8. Magnetic item
9. Iron/magnetic item
10. Elastic item
11. Grommet
12. Tunnels
13. Group of risers
14. Means of opening
15. Plate
15'. Half lower plate
15". Half upper plate
16. Plate 15 grommet
17. Holding flap
18. Tab
19. Additional material
20. Visualisation window
21. Upper protective flap
22. Reserve container
23. Secondary flaps
24. Pocket housing
25a. Holding item
25b. Holding item
26. Guide of the elastic
27. Tie
28. Connection ring
29. Closing bridle
30. Lower holding location 31. Upper holding location
33. Loop
34. Holding pin
35. Pocket
36. Spring
37. Orifice
38. Orifice
39. Fixing screw
40. Plate orifice
41. Holding flap 17 grommet
42. Knot
43. Housing pocket
44. Elastic loop
45. Spacer
46. Pin cover
47. Spring clip
48. Spring clip housing
49. Groove
B Stop
L. Length between the fastening point and the grommet
l. Length between the fastening point and the end of the closing pin

The invention claimed is:

1. A harness-container including:
 a primary container, which receives a deployment bag in which the main canopy is packed, this is linked to riser groups, which are attached to the harness-container via a first release mechanism;
 a primary pilot chute linked to the deployment bag and packed;
 a second release mechanism to release the riser groups of the main canopy from the harness-container in case of a main canopy malfunction;
 a control handle to release the riser groups of the main canopy;
 a secondary container which receives a reserve deployment bag in which the reserve canopy is packed, this is linked to riser groups which are part of the harness-container, which can not be released;
 a reserve pilot chute packed into the secondary container;
 a reserve bridle linking the reserve pilot chute with the reserve deployment bag;
 a Reserve Static Lanyard having a first end and a second end and being linked to the main canopy;
 a first connector carried by the second end of the Reserve Static Lanyard and a second connector, connecting with the first connector, carried by the reserve bridle, which in combination form the connection between the Reserve Static Lanyard and the reserve bridle, the first connector and the second connector being detachable only in case of a reserve only procedure where the main canopy remains in the primary container during the reserve only procedure;
 a third connector carried by the Reserve Static Lanyard and fourth connector, connecting with the third connector carried by at least one of the Reserve Static Lanyard and the secondary container, forming in combination, the connection between the Reserve Static Lanyard and the secondary container, the third connector and the fourth connector being detachable only in case of a cutaway, when the main canopy pulls the Reserve Static Lanyard, which opens the secondary container, frees the reserve pilot chute from the secondary container and pulls the reserve bridle to extract the reserve deployment bag;
 wherein the connection between the first connector and the second connector does not give way in case of a cutaway of the main canopy and the connection between the third connector and the fourth connector does not give way in case of the reserve only procedure.

2. The harness-container according to the claim 1, wherein the first connector and the third connector are carried by a plate, the first connector being carried by one side of the plate and the third connector being carried by the other side of the plate, the plate being found at the second end of the Reserve Static Lanyard and, the harness container in an assembled state, ready for use, has the plate sandwiched, between a part of the reserve bridle which carries the second connector and a surface of an inner flap of the secondary container.

3. The harness-container according to claim 2, wherein the first connector is made up of at least one first loop and the third connector is made up of at least one second loop.

4. The harness-container according to claim 3, wherein the part of the reserve bridle carrying the second connector includes one or several grommets for the passage of the at least one first loop and further comprising a closing pin carrying at one end a ring fixed onto the reserve bridle, the other end of the closing pin passing through the at least one first loop.

5. The harness-container according to claim 4, wherein the distance between an attachment point of the ring on the closing pin, onto the reserve bridle and the one or several grommets set into the reserve bridle, is longer than the length of the closing pin.

6. The harness-container according to claim 5, further comprising a closing pin guiding device on the part of the reserve bridle carrying the second connector.

7. The harness-container according to claim 6, wherein the closing pin guiding device is made up of at least one of at least one guiding loop and a tunnel fixed onto the reserve.

8. The harness-container according to claim 7, further comprising at least one first member selected from the group consisting of: magnets, a break tie, a touch fastener and rubber bands, the at least one first member joining two parts of a fold of the reserve bridle on the reserve bridle, and the at least one first member guaranteeing maintenance of the first connector and the second connector.

9. The harness-container according to claim 3, further comprising a pocket on the surface of the inner flap to which the plate is applied, wherein the harness-container in an assembled state, ready for use, has the end of the plate, opposite to that attached to the second end of the Reserve Static Lanyard, introduced into the pocket in such a way that the at least one of the at least one first loop and the at least one second loop is outside of the pocket.

10. The harness-container according to claim 3, wherein the inner flap of the secondary container against which the plate is applied, includes one or several grommets, the at least one second loop carried by the plate constituting the third connector passing through the one or several grommets, the Reserve Static Lanyard having a holding pin with a ring at one end through which the Reserve Static Lanyard passes, the other end of the holding pin going through the at least one second loop sliding of the holding pin on the Reserve Static Lanyard towards the plate being limited by a stop, in such a way that the distance between the stop and the at least one second loop of the plate is greater than the length of the holding pin.

11. The harness-container according to claim 10, wherein the Reserve Static Lanyard and the inner flap of the secondary container carry at least one second member selected from the group consisting of: magnets, a break tie, a touch fastener, rubber bands and a connection formed by a loop carried by the bridle or the plate, and a pocket formed on the inner flap of the secondary container, into which said loop is introduced;

wherein the at least one second member guarantees attachment of the third connector and the fourth connector.

12. The harness-container according to claim 11, wherein the at least one second member carried by the Reserve Static Lanyard, is carried on a piece of material sewn onto the Reserve Static Lanyard.

13. The harness-container according to claim 12, further comprising a holding pin guiding device on the inner flap of the secondary container.

14. The harness-container according to claim 13, wherein the holding pin guiding device is made up of at least one of a tunnel sewn onto the inner flap of the secondary container and at least one guiding loop and is attached to the inner flap of the secondary container.

15. The harness-container according to claim 10, wherein the plate has a pivoting connection with the at least one second loop of the third connector.

16. The harness-container according to claim 8, wherein the inner flap of the secondary container against which the plate is applied, includes one or several grommets, the at least one second loop passing through the one or several grommets, the Reserve Static Lanyard having a holding pin with a ring at one end through which the Reserve Static Lanyard passes, the other end of the holding pin going through the at least one second loop, sliding of the holding pin on the Reserve Static Lanyard towards the plate being limited by a stop, in such a way that the distance between the stop and the at least one second loop of the plate is greater than the length of the holding pin;
  wherein the Reserve Static Lanyard and the inner flap of the secondary container carry at least one second member selected from the group consisting of magnets, a break tie, a touch fastener, rubber bands and a connection formed by a loop carried by the reserve bridle or the plate, and a pocket formed on the inner flap of the secondary container, into which said loop is introduced;
  wherein the at least one second member guarantees attachment of the third connector and the fourth connector; and
  wherein the force necessary to make the at least one second member separate is greater than the force necessary to make the at least one first member separate, so that a first connection formed between the third connector and the fourth connector is more resistant than a second connection formed between the first connector and the second connector.

17. The harness-container according to claim 1, wherein the first connector is formed by a loop formed at the second end of the Reserve Static Lanyard, the part of the reserve bridle bearing the second connector having a grommet, said loop passing through the grommet, and wherein a closing pin constitutes the second connector, the closing pin bearing at one end a ring fixed to the reserve bridle, the other end of the closing pin being introduced into said loop.

18. The harness-container according to claim 1, wherein the third connector and the fourth connector are constituted by a hook and loop fastener placed between a part of the Reserve Static Lanyard and the secondary container.

19. The harness-container according to claim 1, wherein the second connector is formed by a closing pin, the closing pin bearing at one end a ring fixed to the reserve bridle, said ring also bearing the first end of a closing bridle formed of two parts joined by a connection ring, a first loop being formed at the free end of the closing bridle, so that, when the free end of the closing bridle bearing the loop passes through a second loop formed at the second end of the Reserve Static Lanyard, the first loop of the closing bridle constitutes the first connector, which passes through a grommet set into the part of the bridle bearing the second connector, and into which is introduced the other end of the closing pin constituting the second connector.

20. The harness-container according to claim 19, wherein the third connector and the fourth connector are constituted by a plate releasably fixed to an inner flap of the secondary container via a hook and loop fastener or magnets, the plate having a grommet through which passes the free end of the closing bridle, the plate being incorporated between the second loop of the second end of the Reserve Static Lanyard and the reserve bridle.

21. The harness-container according to claim 1, wherein the third connector and the fourth connector are constituted by a plate releasably fixed to an inner flap of the secondary container via a hook and loop fastener or magnets, the plate having a grommet through which passes the second end of the Reserve Static Lanyard.

* * * * *

UNITED STATES PATENT AND TRADEMARK OFFICE
CERTIFICATE OF CORRECTION

PATENT NO.        : 8,074,934 B2                                        Page 1 of 1
APPLICATION NO.   : 12/231916
DATED             : December 13, 2011
INVENTOR(S)       : Fradet It is certified that error appears in the above-identified patent and that said Letters Patent is hereby corrected as shown below:

In Column 16, line 32 (Line 3 of Claim 7) after the word "reserve" please insert the word:
-- bridle --.

In Column 16, line 56 (Line 9 of Claim 10) after the word "loop" please insert: -- , --.

Signed and Sealed this
Twenty-eighth Day of February, 2012

David J. Kappos
*Director of the United States Patent and Trademark Office*